US009058772B2

(12) United States Patent
Ebisuno et al.

(10) Patent No.: US 9,058,772 B2
(45) Date of Patent: Jun. 16, 2015

(54) DISPLAY DEVICE AND DRIVING METHOD THEREOF

(75) Inventors: Kouhei Ebisuno, Kyoto (JP); Toshiyuki Kato, Osaka (JP)

(73) Assignee: JOLED INC., Tokyo (JP)

( * ) Notice: Subject to any disclaimer, the term of this patent is extended or adjusted under 35 U.S.C. 154(b) by 0 days.

(21) Appl. No.: 13/157,577

(22) Filed: Jun. 10, 2011

(65) Prior Publication Data

US 2011/0242087 A1 Oct. 6, 2011

Related U.S. Application Data

(63) Continuation of application No. PCT/JP2010/000149, filed on Jan. 13, 2010.

(51) Int. Cl.
*G06F 3/038* (2013.01)
*G09G 3/32* (2006.01)

(52) U.S. Cl.
CPC ...... *G09G 3/3233* (2013.01); *G09G 2320/0223* (2013.01); *G09G 2320/0285* (2013.01); *G09G 2320/029* (2013.01); *G09G 2320/043* (2013.01); *G09G 2320/045* (2013.01); *G09G 2330/02* (2013.01); *G09G 2330/021* (2013.01); *G09G 2330/08* (2013.01); *G09G 2360/16* (2013.01)

(58) Field of Classification Search
CPC .......................... G09G 3/3225; G09G 3/3258
USPC ......................................... 345/212, 211, 204
See application file for complete search history.

(56) References Cited

U.S. PATENT DOCUMENTS

| | | | |
|---|---|---|---|
| 6,518,962 | B2 | 2/2003 | Kimura et al. |
| 7,362,322 | B2 | 4/2008 | Kimura et al. |
| 7,864,172 | B2 | 1/2011 | Miyake et al. |
| 7,973,745 | B2 | 7/2011 | Mizukoshi et al. |
| 8,089,428 | B2 | 1/2012 | Yaguchi et al. |
| 8,547,307 | B2 | 10/2013 | Shirouzu et al. |
| 2001/0043168 | A1 | 11/2001 | Koyama et al. |

(Continued)

FOREIGN PATENT DOCUMENTS

| | | |
|---|---|---|
| CN | 101273398 B | 6/2011 |
| EP | 2284825 | 2/2011 |

(Continued)

OTHER PUBLICATIONS

International Search Report in P.C.T. International Application No. PCT/JP2011/003424, mail date is Sep. 27, 2011.

(Continued)

*Primary Examiner* — William Boddie
*Assistant Examiner* — Jeffrey A Parker
(74) *Attorney, Agent, or Firm* — Greenblum & Bernstein, P.L.C.

(57) ABSTRACT

A display device includes a plurality of luminescent pixels arranged in a display. A power supply is connected to the plurality of luminescent pixels and configured to apply a high potential and a low potential to the plurality of luminescent pixels. A voltage measurer is configured to measure, for at least one pixel from among the plurality of luminescent pixels arranged in the display, at least one potential of the high potential and the low potential applied to the at least one pixel. A voltage regulator is configured to regulate the power supply in accordance with the at least one potential measured by the voltage measurer by setting a potential difference between the high potential and the low potential applied to the at least one pixel to a predetermined potential difference.

18 Claims, 21 Drawing Sheets

(56) References Cited

U.S. PATENT DOCUMENTS

| | | | | |
|---|---|---|---|---|
| 2002/0180721 | A1 | 12/2002 | Kimura et al. | |
| 2003/0063081 | A1 | 4/2003 | Kimura et al. | |
| 2004/0070331 | A1 | 4/2004 | Kuno et al. | |
| 2006/0038501 | A1 | 2/2006 | Koyama et al. | |
| 2006/0077137 | A1 | 4/2006 | Kwon | |
| 2006/0176253 | A1 | 8/2006 | Yazawa et al. | |
| 2007/0080905 | A1 | 4/2007 | Takahara | |
| 2007/0145902 | A1 | 6/2007 | Yaguchi et al. | |
| 2008/0180365 | A1 | 7/2008 | Ozaki | |
| 2008/0186297 | A1 * | 8/2008 | Morita | 345/211 |
| 2008/0266216 | A1 * | 10/2008 | Choi | 345/77 |
| 2008/0291135 | A1 | 11/2008 | Kim et al. | |
| 2008/0297055 | A1 | 12/2008 | Miyake et al. | |
| 2009/0026969 | A1 | 1/2009 | Joo | |
| 2009/0207106 | A1 * | 8/2009 | Mizukoshi et al. | 345/76 |
| 2009/0303162 | A1 | 12/2009 | Kohno et al. | |
| 2010/0110059 | A1 * | 5/2010 | Kang et al. | 345/211 |
| 2010/0214273 | A1 | 8/2010 | Shirouzu et al. | |
| 2010/0259528 | A1 * | 10/2010 | Smith et al. | 345/212 |
| 2011/0157134 | A1 | 6/2011 | Ogura | |
| 2011/0169798 | A1 * | 7/2011 | Lee et al. | 345/211 |
| 2011/0255586 | A1 | 10/2011 | Li et al. | |
| 2013/0285889 | A1 | 10/2013 | Shirouzu et al. | |

FOREIGN PATENT DOCUMENTS

| | | |
|---|---|---|
| JP | 2003-280590 | 10/2003 |
| JP | 2004-246250 | 9/2004 |
| JP | 2006-065148 | 3/2006 |
| JP | 2006-251602 | 9/2006 |
| JP | 2007-121430 | 5/2007 |
| JP | 2008-268914 | 11/2008 |
| JP | 2008-299019 | 12/2008 |
| JP | 2009-198691 | 9/2009 |
| JP | 2009-294376 | 12/2009 |
| JP | 2010-199501 | 9/2010 |
| WO | 98/040871 | 9/1998 |
| WO | 2010/001590 | 1/2010 |

OTHER PUBLICATIONS

International Search Report in P.C.T. International Application No. PCT/JP2011/003432, mail date is Sep. 27, 2011.

International Search Report in P.C.T. International Application No. PCT/JP2011/003979, mail date is Aug. 16, 2011.

International Search Report in P.C.T. International Application No. PCT/JP2011/003609, mail date is Sep. 20, 2011.

International Search Report in P.C.T. International Application No. PCT/JP2011/003989, mail date is Aug. 09, 2011.

International Search Report in PCT/JP2010/000149, dated Feb. 9, 2010.

U.S. Appl. No. 13/467,462, filed May 9, 2012.

U.S. Appl. No. 13/493,229, filed Jun. 11, 2012.

U.S. Appl. No. 13/495,419, filed Jun. 13, 2012.

Office Action from Japan Patent Office (JPO) in Japanese Patent Application No. 2010-525132, dated Nov. 26, 2013.

Office Action from U.S. Patent and Trademark Office (USPTO) in U.S. Appl. No. 13/467,462, dated Aug. 28, 2013.

Office Action, mailed Feb. 24, 2014, in related U.S. Appl. No. 13/467,462.

Extended European Search Report from the European Patent Office (E.P.O.), mailed Jun. 17, 2014, for the related European Patent Application No. 11846054.2.

Extended European Search Report from the European Patent Office, mailed Oct. 9, 2014, in related European Patent Application No. 11867592.5.

Extended European Search Report from the European Patent Office, mailed Oct. 29, 2014, in related European Patent Application No. 11869299.5.

Office Action, mailed Aug. 13, 2014, in related U.S. Appl. No. 13/467,462.

Japan Office Action, mailed Mar. 24, 2015, in related Japanese Patent Application No. 2012-502383.

Chinese Office Action together with Search Report (including English language translation of Search Report), mailed Feb. 10, 2015, in corresponding Chinese Patent Application No. 201180004566.6.

* cited by examiner

FIG. 6

| Video data (Gradation) | Required voltage (Red) | Required voltage (Green) | Required voltage (Blue) |
|---|---|---|---|
| 0 | 4 | 4.2 | 3.5 |
| 1 | 4.1 | 4.3 | 3.5 |
| 2 | 4.1 | 4.4 | 3.6 |
| 3 | 4.2 | 4.5 | 3.6 |
| ⋮ | ⋮ | ⋮ | ⋮ |
| 176 | 8.3 | 9.6 | 6.7 |
| 177 | 8.5 | 9.9 | 6.9 |
| ⋮ | ⋮ | ⋮ | ⋮ |
| 253 | 10.5 | 11.4 | 8.2 |
| 254 | 10.8 | 11.8 | 8.3 |
| 255 | 11.2 | 12.2 | 8.4 |

FIG. 7

| Potential difference value [V] | Voltage drop margin |
|---|---|
| 0.0 | 0.0 |
| 0.2 | 0.2 |
| 0.4 | 0.4 |
| 0.6 | 0.6 |
| ⋮ | ⋮ |
| 3.4 | 3.4 |
| 3.6 | 3.6 |
| ⋮ | ⋮ |
| 5.6 | 5.6 |
| 5.8 | 5.8 |
| 6.0 | 6.0 |

DISPLAY DEVICE AND DRIVING METHOD THEREOF

CROSS REFERENCE TO RELATED APPLICATION(S)

This is a continuation application of PCT Application No. PCT/JP2010/000149 filed Jan. 13, 2010, designating the United States of America, the disclosure of which, including the specification, drawings and claims, is incorporated herein by reference in its entirety.

BACKGROUND OF THE INVENTION

1. Field of the Invention

The present invention relates to active matrix display devices which use current-driven luminescence elements represented by organic electroluminescence (EL) elements and to driving methods thereof, and more particularly to a display device having excellent power consumption reducing effect and to a driving method thereof.

2. Description of the Related Art

In general, the luminance of an organic electroluminescence (EL) element is dependent upon the drive current supplied to the element, and the luminance of the luminescence of the element increases in proportion to the drive current. Therefore, the power consumption of displays made up of organic EL elements is determined by the average of display luminance. Specifically, unlike liquid crystal displays, the power consumption of organic EL displays varies significantly depending on the displayed image.

For example, in an organic EL display, the highest power consumption is required when displaying an all-white image, whereas, in the case of a typical natural image, power consumption which is approximately 20 to 40% that for all-white is considered to be sufficient.

However, because power source circuit design and battery capacity entail designing which assumes the case where the power consumption of a display becomes highest, it is necessary to consider power consumption that is 3 to 4 times that for the typical natural image, and thus becoming a hindrance to the lowering of power consumption and the miniaturization of devices.

Consequently, there is conventionally proposed a technique which suppresses power consumption with practically no drop in display luminance by detecting the peak value of video data, and adjusting the cathode voltage of the organic EL elements based on such detected data so as to reduce power source voltage (for example, see Patent Reference 1: Japanese Unexamined Patent Application Publication No. 2006-065148).

SUMMARY OF THE INVENTION

Now, since an organic EL element is a current-driven element, current flows through a power source wire and a voltage drop which is proportionate to the wire resistance occurs. As such, the power supply voltage to be supplied to the display is set by adding a margin for the amount of voltage rise following a voltage drop.

In the same manner as the previously described power source circuit design and battery capacity, since the margin for the voltage rise is set assuming the case where the power consumption of the display becomes highest, unnecessary power is consumed for typical natural images.

In a small-sized display intended for mobile device use, panel current is small and thus, compared to the voltage to be consumed by luminescence pixels, the margin for the voltage rise is negligibly small. However, when current increases with the enlargement of panels, the voltage drop occurring in the power source wire no longer becomes negligible.

However, in the conventional technique in the above-mentioned Patent Reference 1, although power consumption in each of the luminescent pixels can be reduced, the margin for the voltage rise following a voltage drop cannot be reduced, and is thus insufficient in terms of the power consumption reducing effect for household large-sized display devices of 30-inches and above.

The present invention is conceived in view of the above described problem and has as an object to provide a display device having excellent power consumption reducing effect and a driving method thereof.

In order to achieve the aforementioned object, the display device according to an aspect of the present invention includes: a power supplying unit configured to output a high potential and a low potential; a display unit in which luminescent pixels connected to the power supplying unit are arranged; a voltage measuring unit configured to measure, for at least one luminescent pixel among the luminescent pixels in the display unit, at least one potential out of the high potential applied to the at least one luminescent pixel and the low potential applied to the at least one luminescent pixel, the at least one luminescent pixel being predetermined; and a voltage regulating unit configured to regulate the power supplying unit in accordance with the measured at least one potential so as to set a potential difference between the high potential and the low potential of the at least one luminescent pixel to a predetermined potential difference.

The present invention enables the implementation of a display device having excellent power consumption reducing effect.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 6 is a chart showing an example of a required voltage conversion table;

FIG. 7 is a chart showing an example of a voltage margin conversion table;

DESCRIPTION OF THE PREFERRED EMBODIMENT(S)

Figure 1:
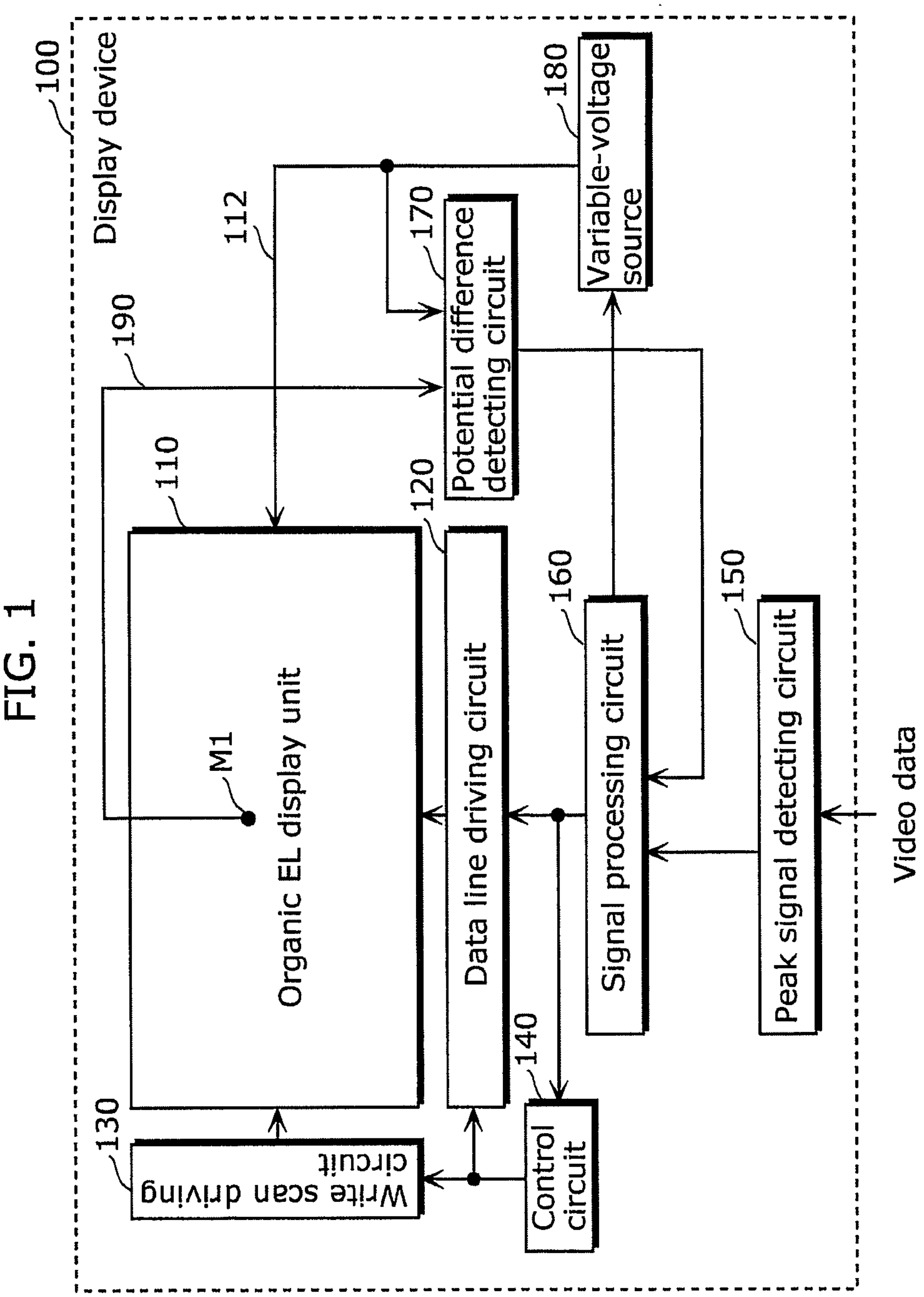
FIG. 1 is a block diagram showing the schematic configuration of a display device according to a first embodiment.

The display device according to the present invention includes: a power supplying unit configured to output a high potential and a low potential; a display unit in which luminescent pixels connected to the power supplying unit are arranged; a voltage measuring unit configured to measure, for at least one luminescent pixel among the luminescent pixels in the display unit, at least one potential out of the high potential applied to the at least one luminescent pixel and the low potential applied to the at least one luminescent pixel, the at least one luminescent pixel being predetermined; and a voltage regulating unit configured to regulate the power supplying unit in accordance with the measured at least one potential so as to set a potential difference between the high potential and the low potential of the at least one luminescent pixel to a predetermined potential difference.

Accordingly, by regulating at least one of the high output potential of the power supplying unit and the low output potential of the power supplying unit in accordance with the amount of voltage drop occurring from the power supplying unit to at least one luminescent pixel, power consumption can be reduced.

Furthermore, the display device may, further include at least one of: a high-potential monitor wire which has one end connected to the at least one luminescent pixel and the other end connected to the voltage measuring unit, for transmitting the high potential applied to the at least one luminance pixel; and a low-potential monitor wire which has one end connected to the at least one luminescent pixel and the other end connected to the voltage measuring unit, for transmitting the low potential applied to the at least one luminance pixel.

With this, the voltage measuring unit can measure at least one of the high potential applied to the at least one luminescent pixel via the high-potential monitor wire and the low potential applied to at least one luminescent pixel via the low-potential monitor wire.

Furthermore, the voltage measuring unit may be further configured to: measure at least one of a high output potential of the power supplying unit and a low output potential of the power supplying unit; and detect at least one potential difference out of (i) a potential difference between the high output potential of the power supplying unit and the high potential applied to the at least one luminescent pixel and (ii) a potential difference between the low output potential of the power supplying unit and the low potential applied to the at least one luminescent pixel, and the voltage regulating unit may be configured to regulate the power supplying unit in accordance with the at least one potential difference detected by the voltage measuring unit.

Accordingly, since the voltage measuring unit can actually measure the voltage drop amount from the power supplying unit up to a predetermined luminescent pixel, the high output potential of the power supplying unit and the low output potential of the power supplying unit can be set to an optimal potential in response to the voltage drop amount measured by the voltage measuring unit.

Furthermore, the voltage regulating unit may be configured to regulate the power supplying unit so that (i) the at least one potential difference detected by the voltage measuring unit and (ii) a potential difference between the high output potential and the low output potential of the power supplying unit are in an increasing function relationship.

Furthermore, the voltage regulating unit may be configured to detect a potential difference between the at least one potential of the at least one luminescent pixel measured by the voltage measuring unit and a predetermined potential, and to regulate the power supplying unit in accordance with the detected potential difference.

Accordingly, even when the high output potential of the power supplying unit and the low output potential of the power supplying unit cannot be measured, at least one of the high output potential of the power supplying unit and the low output potential of the power supplying unit can be regulated in accordance with the voltage drop amount occurring from the power supplying unit to the at least one luminescent pixel. Therefore, power consumption can be reduced.

Furthermore, the voltage regulating unit may be configured to regulate the power supplying unit so that (i) the detected potential difference and (ii) a potential difference between a high output potential of the power supplying unit and a low output potential of the power supplying unit are in an increasing function relationship.

Furthermore, the voltage measuring unit may be configured to measure, for each of two or more luminescent pixels among the luminescent pixels, at least one potential out of the high potential and the low potential that are applied.

Accordingly, the high output potential of the power supplying unit and the low output potential of the power supplying unit can be regulated more appropriately. Therefore, power consumption can be effectively reduced even when the size of the display unit is increased.

Furthermore, the voltage regulating unit may be configured to select at least one potential out of (i) a lowest potential among the two or more high potentials measured by the voltage measuring unit and (ii) a highest potential among the two or more low potentials measured by the voltage measuring unit, and to regulate the power supplying unit based on the selected at least one potential.

Accordingly, the high output potential of the power supplying unit and the low output potential of the power supplying unit can be optimized.

Furthermore, it is preferable that: each of the luminescent pixels include a driving element and a luminescent element; the driving element includes a source electrode and a drain electrode; the luminescent element includes a first electrode and a second electrode, the first electrode being connected to one of the source electrode and the drain electrode of the driving element; and the high potential is applied to one of (i) the other of the source electrode and the drain electrode and (ii) the second electrode, and the low potential is applied to the other of (i) the other of the source electrode and the drain electrode and (ii) the second electrode.

Furthermore, the second electrode may form part of a common electrode which is provided in common to the luminescent pixels, the common electrode may be electrically connected with the power supplying unit so that potential is applied to the common electrode from a periphery of the common electrode, and the at least one luminescent pixel that is predetermined may be located near a center of the display unit.

Accordingly, since regulating is performed based on the potential difference at the location where the voltage drop amount is normally largest such as near the center of the display unit, the high output potential of the power supplying unit and the low output potential of the power supplying unit can be easily regulated particularly when the size of the display unit is increased.

Furthermore, the second electrode may be made of a transparent conductive material including a metal oxide.

Furthermore, the luminescent element may be an organic electroluminescence (EL) element.

Since heat generation is suppressed through the reduction of power consumption, the deterioration of the organic EL element can be suppressed.

Furthermore, the present invention can be implemented, not only as such a display device, but also as display device driving method having the processing units included in the display device as steps.

The driving method of a display device according to the present invention is a driving method of a display device including a power supplying unit and a display panel, the power supplying unit outputting a high potential and a low potential, and the display panel including luminescent pixels connected to the power supplying unit, the method including: measuring at least one of a high potential applied to at least one luminescent pixel among the luminescent pixels and a low potential applied to the at least one luminescent pixel; and regulating the power supplying unit in accordance with the at least one potential measured in the measuring so as to set a potential difference between the high potential and the low potential of the at least one luminescent pixels to a predetermined potential difference.

Furthermore, in the measuring, potentials may be measured over plural display frames, and in the regulating, the potential measured over plural display frames may be averaged, and the power supplying unit may be regulated in accordance with the average potential.

Accordingly, by using the average from plural display frames, it is possible to reduce the number of power source voltage regulation operations per unit time and minimize the increase in power consumption accompanying the charging and discharging of electric charge due to power source voltage regulation operation while reducing the power consumption of the display device as a whole.

Hereinafter, the preferred embodiments of the present invention shall be described based on the Drawings. It is to be noted that, in all the figures, the same reference numerals are given to the same or corresponding elements and redundant description thereof shall be omitted.

First Embodiment

A display device according to the present embodiment includes: a power supplying unit configured to output a high potential and a low potential; a display unit in which luminescent pixels connected to the power supplying unit are arranged; a voltage measuring unit configured to measure, for at least one luminescent pixel among the luminescent pixels in the display unit, at least one potential out of the high potential applied to the at least one luminescent pixel and the low potential applied to the at least one luminescent pixel, the at least one luminescent pixel being predetermined; and a voltage regulating unit configured to regulate the power supplying unit in accordance with the measured at least one potential so as to set a potential difference between the high potential and the low potential of the at least one luminescent pixel to a predetermined potential difference.

Furthermore, the voltage measuring unit is further configured to: measure at least one of a high output potential of the power supplying unit and a low output potential of the power supplying unit; and detect at least one potential difference out of (i) a potential difference between the high output potential of the power supplying unit and the high potential applied to the at least one luminescent pixel and (ii) a potential difference between the low output potential of the power supplying unit and the low potential applied to the at least one luminescent pixel, and the voltage regulating unit may be configured to regulate the power supplying unit in accordance with the at least one potential difference detected by the voltage measuring unit.

Accordingly, the display device according to an embodiment of the present invention realizes an excellent power consumption reducing effect.

Hereinafter, a first embodiment of the present invention shall be specifically described with reference to the Drawings.

FIG. 1 is a block diagram showing the schematic configuration of a display device according to the present embodiment.

A display device 100 shown in the figure includes an organic electroluminescence (EL) display unit 110, a data line driving circuit 120, a write scan driving circuit 130, a control circuit 140, a peak signal detecting circuit 150, a signal processing circuit 160, a potential difference detecting circuit 170, a variable-voltage source 180, and a monitor wire 190.

Figure 2:
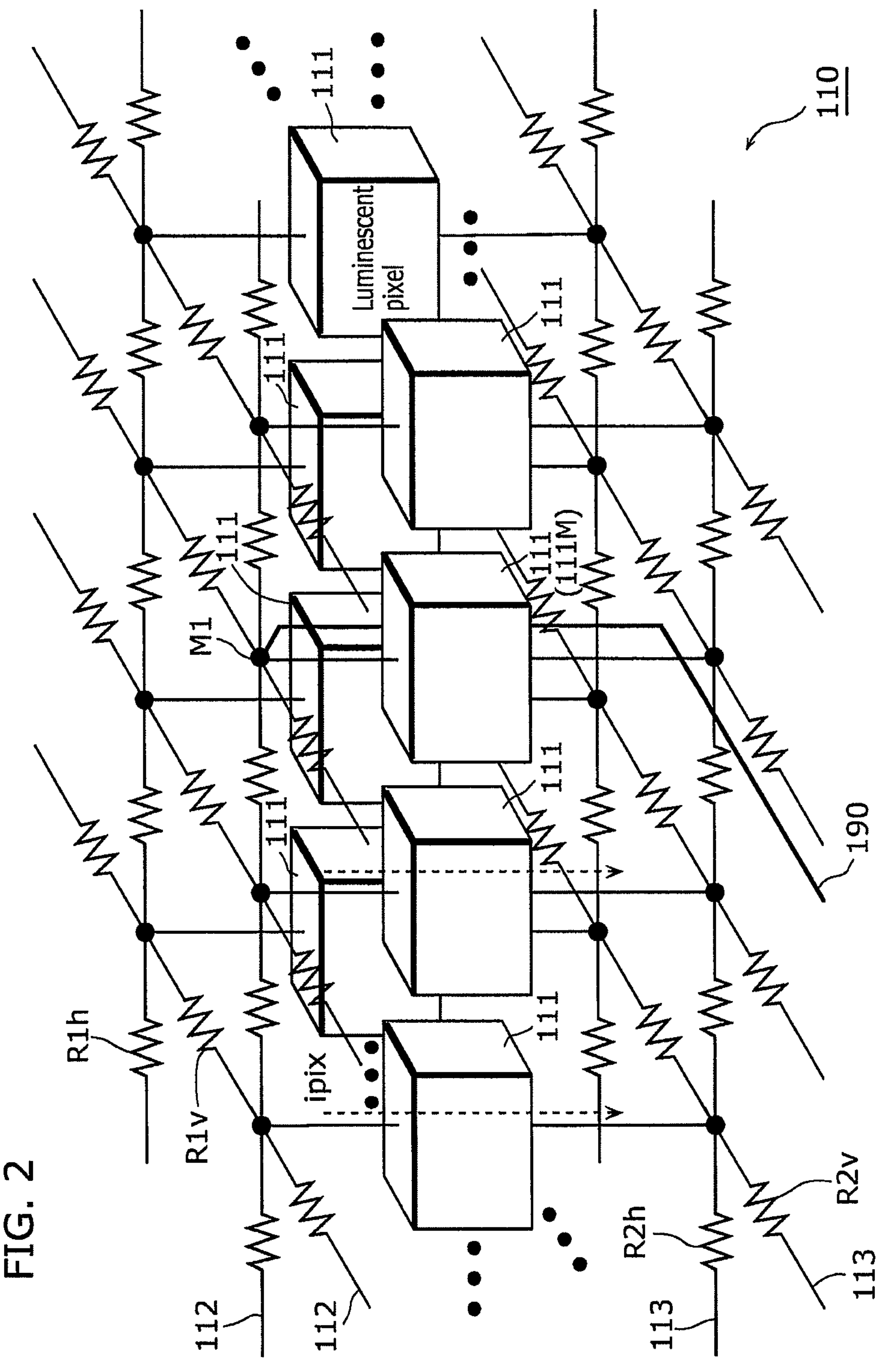
FIG. 2 is a perspective view schematically showing the configuration of an organic EL display unit.

FIG. 2 is a perspective view schematically showing the configuration of the organic EL display unit 110. It is to be noted that the lower portion in the figure is the display screen side.

As shown in the figure, the organic EL display unit 110 includes luminescent pixels 111, a first power source wire 112, and a second power source wire 113.

Each luminescent pixel 111 is connected to the first power source wire 112 and the second power source wire 113, and produces luminescence at a luminance that is in accordance with a pixel current ipix that flows to the luminescent pixel 111. At least one predetermined luminescent pixel out of the luminescent pixels 111 is connected to the monitor wire 190 at a detecting point M1. Hereinafter, the luminescent pixel 111 that is directly connected to the monitor wire 190 shall be denoted as the monitor luminescent pixel 111M. The monitor luminescent pixel 111M is located near the center of the organic EL display unit 110. It is to be noted that near the center includes the center and the surrounding parts thereof.

The first power source wire 112 is arranged in a net-like manner. On the other hand, the second power source wire 113 is formed in a continuous film-form on the organic EL display unit 110, and potential outputted by the variable-voltage source 180 is applied from the periphery of the organic EL display unit 110. In FIG. 2, the first power source wire 112 and the second power source wire 113 are schematically illustrated in mesh-form in order to show the resistance components of the first power source wire 112 and the second power source wire 113. It is to be noted that the second power source wire 113 is, for example, a grounding wire, and may be grounded to a common grounding potential of the display device 100, at the periphery of the organic EL display unit 110.

A horizontal-direction first power source wire resistance R1*h* and a vertical-direction first power source wire resistance R1*v* are present in the first power source wire 112. A horizontal-direction second power source wire resistance R2*h* and a vertical-direction second power source wire resistance R2*v* are present in the second power source wire 113. It is to be noted that, although not illustrated, each of the luminescent pixels 111 is also connected to a scanning line for controlling the timing at which the luminescent pixel produces luminescence and stops producing luminescence, and to a data line for supplying signal voltage corresponding to the luminescence luminance of the luminescent pixel 111. The scanning line and the data line are connected to the write scan driving circuit 130 and the data line driving circuit 120, respectively.

Figure 3:
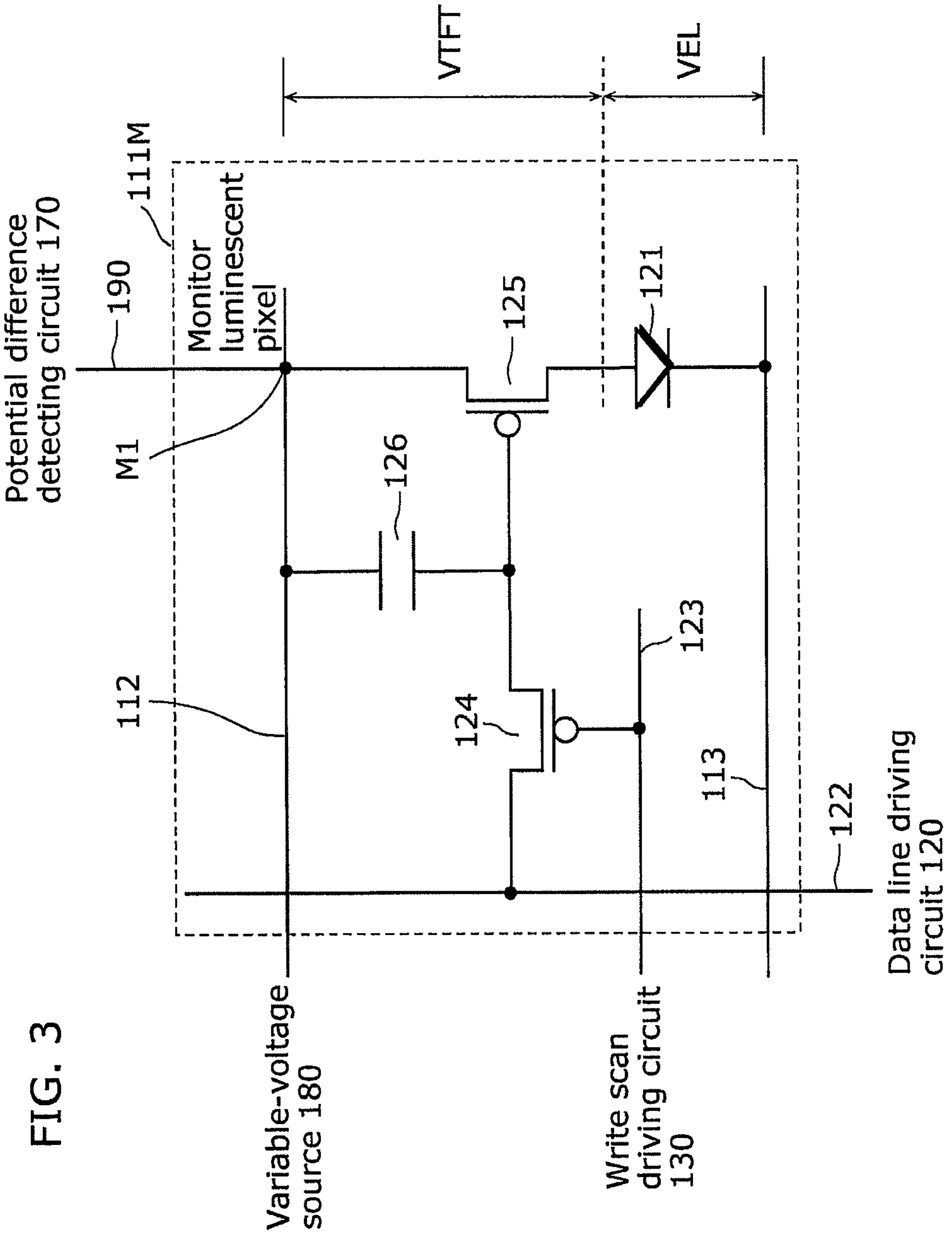
FIG. 3 is a circuit diagram showing an example of a specific configuration of a luminescent pixel.

FIG. 3 is a circuit diagram showing an example of a specific configuration of a luminescent pixel 111.

The luminescent pixel 111 shown in the figure includes a driving element and a luminescent element. The driving element includes a source electrode and a drain electrode. The luminescent element includes a first electrode and a second electrode. The first electrode is connected to one of the source electrode and the drain electrode of the driving element. The high potential is applied to one of (i) the other of the source electrode and the drain electrode and (ii) the second electrode, and the low potential is applied to the other of (i) the other of the source electrode and the drain electrode and (ii) the second electrode. Specifically, each of the luminescent pixels 111 includes an organic EL element 121, a data line 122, a scanning line 123, a switch transistor 124, a driving transistor 125, and a holding capacitor 126. The monitor luminescent pixels 111 are, for example, arrayed in a matrix in the organic EL display unit 110.

The organic EL element 121, which is the luminescent element according to the present invention, has an anode connected to the drain of the driving transistor 125 and a cathode connected to the second power source wire 113, and produces luminescence with a luminance that is in accordance with the current value flowing between the anode and the cathode. The cathode-side electrode of the organic EL element 121 forms part of a common electrode provided in common to the luminescent pixels 111. The common electrode is electrically connected to the variable-voltage source 180 so that potential is applied to the common electrode from the periphery thereof. Specifically, the common electrode functions as the second power source wire 113 in the organic EL display unit 110. Furthermore, the cathode-side electrode is formed from a transparent conductive material made of a metallic oxide. It is to be noted that the anode-side electrode of the organic EL element 121 is the first electrode according to the present invention, and the cathode-side electrode of the organic EL element 121 is the second electrode according to the present invention.

The data line 122 is connected to the data line driving circuit 120 and one of the source and the drain of the switch transistor 124, and signal voltage corresponding to the vide data is applied to the data line 122 by the data line driving circuit 120.

The scanning line 123 is connected to the write scan driving circuit 130 and the gate of the switch transistor 124, and turns the switching transistor ON and OFF depending on the voltage applied by the write scan driving circuit 130.

The switching transistor 124 has one of a source and a drain connected to the data line 122, the other of the source and the drain connected to the gate of the driving transistor 125 and one end of the holding capacitor 126, and is, for example, a P-type thin-film transistor (TFT).

The driving transistor 125, which is the driving element according to the present invention, has a source connected to the first power source wire 112, a drain connected to the anode of the organic EL element 121, a and a gate connected to one end of the holding capacitor 126 and the other of the source and the drain of the switch transistor 124, and is, for example, a P-type TFT. With this, the driving transistor 125 supplies the organic EL element 121 with current that is in accordance with the voltage held in the holding capacitor 126. Furthermore, in the monitor luminescent pixel 111M, the source of the driving transistor 125 is connected to the monitor wire 190.

The holding capacitor 126 has one end connected to the other of the source and the drain of the switch transistor 124, and the other end connected to the first power source wire 112, and holds the potential difference between the potential of the first power source wire 112 and the potential of the gate of the driving transistor 125 when the switch transistor 124 is turned OFF. Specifically, the holding capacitor 126 holds voltage corresponding to a signal voltage.

The data line driving circuit 120 outputs signal voltage corresponding to video data, to the luminescent pixels 111 via the data line 122.

The write scan driving circuit 130 sequentially scans the luminescent pixels 111 by outputting a scanning signal to scanning lines 123. Specifically, the switch transistors 124 are turned ON and OFF on a row-basis. With this, the signal voltage outputted by the data lines 122 is applied to the luminescent pixels 111 in the row selected by the write scan driving circuit 130. Therefore, the luminescent pixels 111 produce luminescence with a luminance that is in accordance with the video data.

The control circuit 140 instructs the drive timing to each of the data line driving circuit 120 and the write scan driving circuit 130.

The peak signal detecting circuit 150 detects the peak value of the video data inputted to the display device 100, and outputs a peak signal representing the detected peak value to the signal processing circuit 160. Specifically, the peak signal detecting circuit 150 detects, as the peak value, data of the highest gradation out of the video data. High gradation data corresponds to an image that is to be displayed brightly by the organic EL display unit 110.

The signal processing circuit 160, which is the voltage regulating unit according to the present invention in the present embodiment, regulates the variable-voltage source 180 so that the potential of the monitor luminescent pixel 111M is set to a predetermined potential, based on the peak signal outputted by the peak signal detecting circuit 150 and a potential difference ΔV detected by the potential difference detecting circuit 170. Specifically, when causing the luminescent pixels 111 to produce luminescence according to the peak signal outputted by the peak signal detecting circuit 150, the signal processing circuit 160 determines the voltage required by the organic EL element 121 and the driving transistor 125. Furthermore, the signal processing circuit 160 calculates a voltage margin based on the potential difference detected by the potential difference detecting circuit 170. Subsequently, the signal processing circuit 160 sums up a voltage VEL required by the organic EL element 121, a voltage VTFT required by the driving transistor 125, and a voltage drop margin Vdrop, and outputs the summation result VEL+VTFT+Vdrop, as the potential of a first reference voltage Vref1, to the variable-voltage source 180.

Furthermore, the signal processing circuit 160 outputs, to the data line driving circuit 120, a signal voltage corresponding to the video data inputted via the peak signal detecting circuit 150.

The potential difference detecting circuit 170, which is the voltage measuring unit according to the present invention in the present embodiment, measures, for the monitor luminescent pixel 111M, the high potential to be applied to the monitor luminescent pixel 111M. Specifically, the potential difference detecting circuit 170 measures, via the monitor wire 190, the high potential to be applied to the monitor luminescent pixel 111M. Specifically, the potential difference detecting circuit 170 measures the potential at the detecting point M1. In addition, the potential difference detecting circuit 170 measures the high output potential of the variable-voltage source 180, and measures the potential difference ΔV between the measured high potential to be applied to the monitor luminescent pixel 111M and the high output potential of the variable-voltage source 180. Subsequently, the potential difference detecting circuit 170 outputs the measured potential difference ΔV to the signal processing circuit 160.

The variable-voltage source 180, which is the power supplying unit according to the present invention in the present embodiment, outputs the high potential and the low potential to the organic EL display unit 110. The variable-voltage source 180 outputs an output voltage Vout for setting the high potential of the monitor luminescent pixel 111M to the predetermined potential (VEL+VTFT), according to the first reference voltage Vref1 outputted by the signal processing circuit 160

The monitor wire 190 has one end connected to the monitor luminescent pixel 111M and the other end connected to the potential difference detecting circuit 170, and transmits the high potential applied to the monitor luminescent pixel 111M.

Next, the detailed configuration of the variable-voltage source 180 shall be briefly described.

Figure 4:
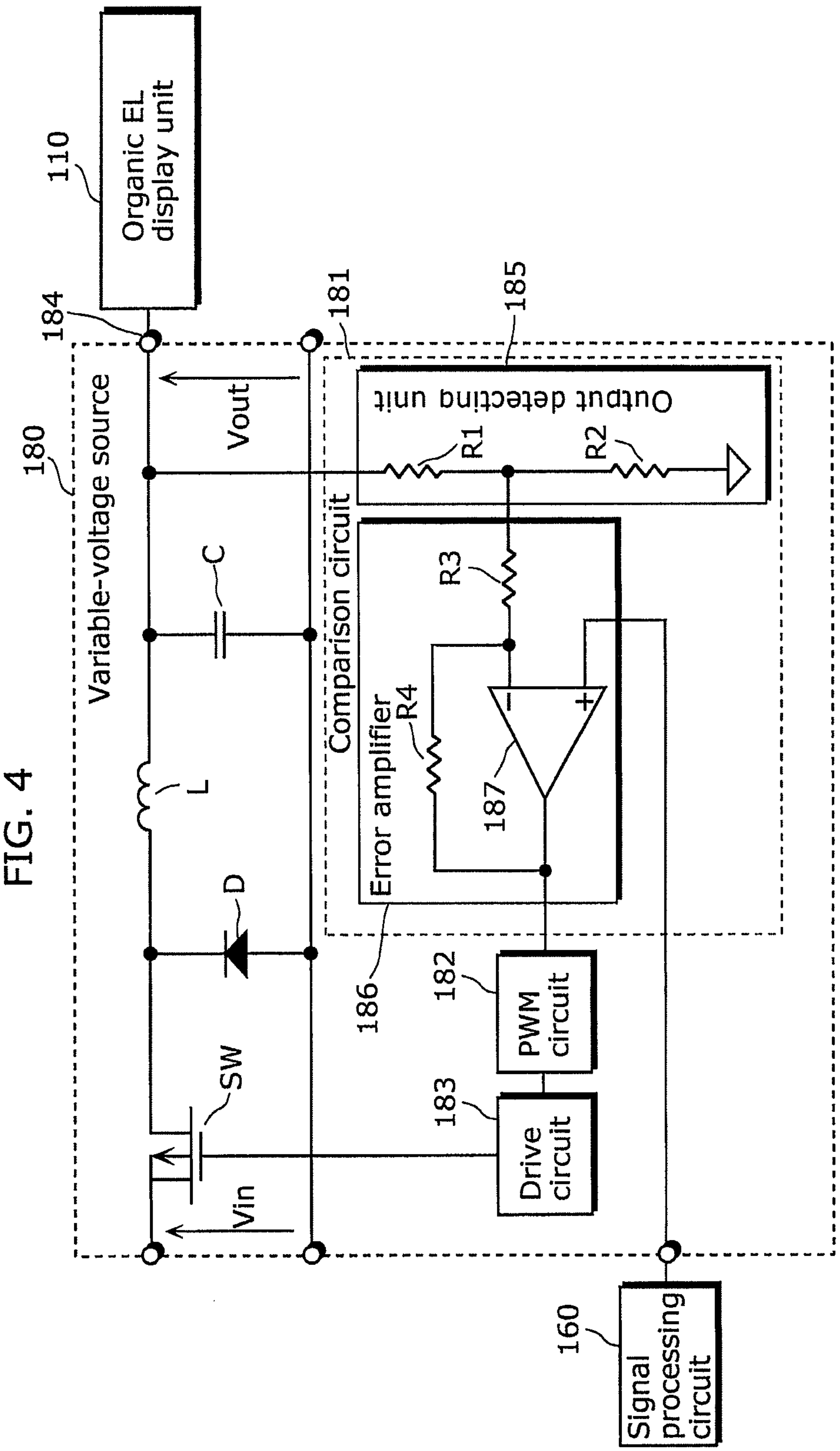
FIG. 4 is a block diagram showing an example of a specific configuration of a variable voltage source.

FIG. 4 is a block diagram showing an example of the specific configuration of a variable-voltage source. It is to be noted that the organic EL display unit 110 and the signal processing circuit 160 which are connected to the variable-voltage source are also shown in the figure.

The variable-voltage source 180 shown in the figure includes a comparison circuit 181, a Pulse Width Modulation (PWM) circuit 182, a drive circuit 183, a switching element SW, a diode D, an inductor L, a capacitor C, and an output terminal 184, and converts an input voltage Vin into an output voltage Vout which is in accordance with the first reference voltage Vref1, and outputs the output voltage Vout from the output terminal 184. It is to be noted that, although not illustrated, an AC-DC converter is provided in a stage ahead of a an input terminal into which the input voltage Vin is inputted, and it is assumed that conversion, for example, from 100V AC to 20V DC is already carried out.

The comparison circuit 181 includes an output detecting unit 185 and an error amplifier 186, and outputs voltage that is in accordance with the difference between the output voltage Vout and the first reference voltage Vref1 to the PWM circuit 182.

The output detecting unit 185, which includes two resistors R1 and R2 provided between the output terminal 184 and a grounding potential, voltage-divides the output voltage Vout in accordance with the resistance ratio between the resistors R1 and R2, and outputs the voltage-divided output voltage Vout to the error amplifier 186.

The error amplifier 186 compares the Vout that has been voltage-divided by the output detection unit 185 and the first reference voltage Vref1 outputted by the signal processing circuit 160, and outputs, to the PWM circuit 182, a voltage that is in accordance with the comparison result. Specifically, the error amplifier 186 includes an operational amplifier 187 and resistors R3 and R4. The operational amplifier 187 has an inverting input terminal connected to the output detecting unit 185 via the resistor R3, a non-inverting input terminal connected to the signal processing circuit 160, and an output terminal connected to the PWM circuit 182. Furthermore, the output terminal of the operational amplifier 187 is connected to the inverting input terminal via the resistor R4. With this, the error amplifier 186 outputs, to the PWM circuit 182, a voltage that is in accordance with the potential difference between the voltage inputted from the output detecting unit 185 and the first reference voltage Vref1 inputted from the signal processing circuit 160. Stated differently, the error amplifier 186 outputs, to the PWM circuit 182, a voltage that is in accordance with the potential difference between the output voltage Vout and the first reference voltage Vref1.

The PWM circuit 182 outputs, to the drive circuit 183, pulse waveforms having different duties depending on the voltage outputted by the comparison circuit 181. Specifically, the PWM circuit 182 outputs a pulse waveform having a long ON duty when the voltage outputted by the comparison circuit 181 is high, and outputs a pulse waveform having a short ON duty when the outputted voltage is low. Stated differently, the PWM circuit 182 outputs a pulse waveform having a long ON duty when the potential difference between the output voltage Vout and the first reference voltage Vref1 is big, and outputs a pulse waveform having a short ON duty when the potential difference between the output voltage Vout and the first reference voltage Vref1 is small. It is to be noted that the ON period of a pulse waveform is a period in which the pulse waveform is active.

The drive circuit 183 turns ON the switching element SW during the period in which the pulse waveform outputted by the PWM circuit 182 is active, and turns OFF the switching element SW during the period in which the pulse waveform outputted by the PWM circuit 182 is inactive.

The switching element SW is turned ON and OFF by the drive circuit 183. The input voltage Vin is outputted, as the output voltage Vout, to the output terminal 184 via the inductor L and the capacitor C only while the switching element SW is ON. Therefore, from 0V, the output voltage Vout gradually approaches 20V (Vin). At this time the inductor L and the capacitor C are charged. Since voltage is applied (charged) to both ends of the inductor L, the output voltage Vout becomes a potential which is lower than the input voltage Vin by such voltage.

As the output voltage Vout approaches the first reference voltage Vref1, the voltage inputted to the PWM circuit 182 decreases, and the ON duty of the pulse signal outputted by the PWM circuit 182 becomes shorter.

Then, the time in which the switching element SW is ON becomes shorter, and the output voltage Vout gently converges with the first reference voltage Vref1.

The potential of the output voltage Vout, while having slight voltage fluctuations, eventually settles to a potential in the vicinity of Vout=Vref1.

In this manner, the variable-voltage source 180 generates the output voltage Vout which approximates the first reference voltage Vref1 outputted by the signal processing circuit 160, and supplies the output voltage Vout to the organic EL display unit 110.

Figure 5:
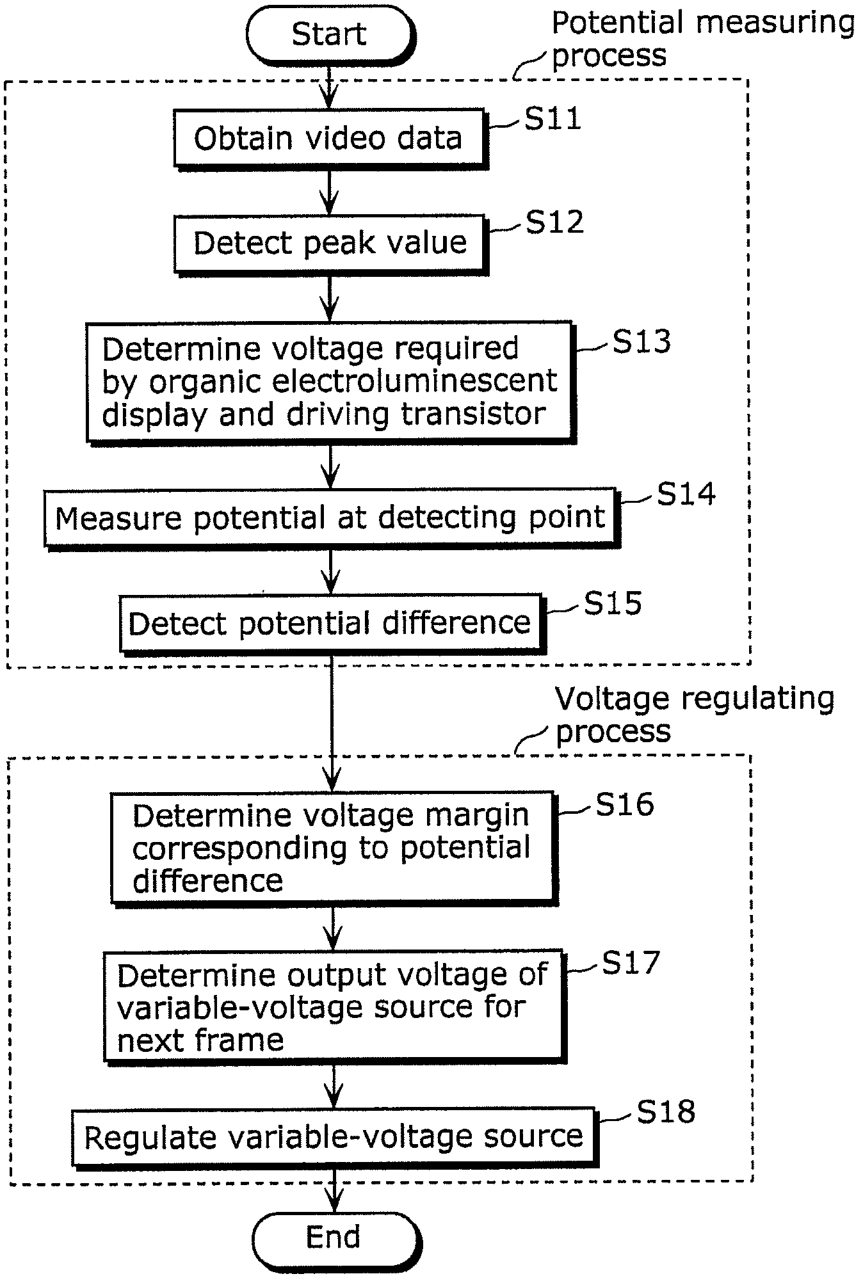
FIG. 5 is a flowchart showing the operation of the display device.

Next, the operation of the aforementioned display device 100 shall be described using FIG. 5 to FIG. 7.

FIG. 5 is a flowchart showing the operation of the display device 100.

First, the peak signal detecting circuit 150 obtains the video data for one frame period inputted to the display device 100 (step S11). For example, the peak signal detecting circuit 150 includes a buffer and stores the video data for one frame period in such buffer.

Next, the peak signal detecting circuit 150 detects the peak value of the obtained video data (step S12), and outputs a peak signal representing the detected peak value to the signal processing circuit 160. Specifically, the peak signal detecting circuit 150 detects the peak value of the video data for each color. For example, for each of red (R), green (G), and blue (B), the video data is expressed using the 256 gradations from 0 to 255 (luminance being higher with a larger value). Here, when part of the video data of the organic EL display unit 110 has R:G:B=177:124:135, another part of the video data of the organic EL display unit 110 has R:G:B=24:177:50, and yet another part of the video data of the organic EL display unit 110 has R:G:B=10:70:176, the peak signal detecting circuit 150 detects 177 as the peak value of R, 177 for the peak value of G, and 176 as the peak value of B, and outputs, to the signal processing circuit 160, a peak signal representing the detected peak value of each color.

Next, the signal processing circuit 160 determines the voltage VTFT required by the driving transistor 125 and the voltage VEL required by the organic EL element 121 when causing the organic EL element 121 to produce luminescence according to the peak values outputted by the peak signal detecting circuit 150 (step S13). Specifically, the signal processing circuit 160 determines the VTFT+VEL corresponding to the gradations for each color, using a required voltage conversion table indicating the required voltage VTFT+VEL corresponding to the gradations for each color.

FIG. 6 is a chart showing an example of the required voltage conversion table provided in the signal processing circuit 160.

As shown in the figure, required voltages VTFT+VEL respectively corresponding to the gradations of each color are stored in the required voltage conversion table. For example, the required voltage corresponding to the peak value 177 of R is 8.5V, the required voltage corresponding to the peak value 177 of G is 9.9V, and the required voltage corresponding to the peak value 176 of B is 6.7V. Among the required voltages corresponding to the peak values of the respective colors, the highest voltage is 9.9V corresponding to the peak value of G. Therefore, the signal processing circuit 160 determines VTFT+VEL to be 9.9V.

Meanwhile, the potential difference detecting circuit 170 detects the potential at the detecting point M1 via the monitor wire 190 (step S14).

Next, the potential difference detecting circuit 170 detects the potential difference ΔV between the potential of the output terminal 184 of the variable-voltage source 180 and the potential at the detecting point M1 (step S15). Subsequently, the potential difference detecting circuit 170 outputs the detected potential difference ΔV to the signal processing circuit 160. It is to be noted that the steps S11 to S15 up to this point correspond to the potential measuring process according to the present invention.

Next, the signal processing circuit 160 determines a voltage drop margin Vdrop corresponding to the potential difference ΔV detected by the potential difference detecting circuit 170, based on a potential difference signal outputted by the potential difference detecting circuit 170 (step S16). Specifically, the signal processing circuit 160 has a voltage margin conversion table indicating the voltage drop margin Vdrop corresponding to the potential difference ΔV.

FIG. 7 is a chart showing an example of the voltage margin conversion table provided in the signal processing circuit 160.

As shown in the figure, voltage drop margins Vdrop respectively corresponding to the potential differences ΔV are stored in the voltage margin conversion table. For example, when the potential difference ΔV is 3.4V, the voltage drop margin Vdrop is 3.4V. Therefore, the signal processing circuit 160 determines the voltage drop margin Vdrop to be 3.4V.

Now, as shown in the voltage margin conversion table, the potential difference ΔV and the voltage drop margin Vdrop have an increasing function relationship. Furthermore, the output voltage Vout of the variable-voltage source 180 rises with a bigger voltage drop margin Vdrop. In other words, the potential difference ΔV and the output voltage Vout have an increasing function relationship.

Next, the signal processing circuit 160 determines the output voltage Vout that the variable-voltage source 180 is to be made to output in the next frame period (step S17). Specifically, the output voltage Vout that the variable-voltage source 180 is to be made to output in the next frame period is assumed to be VTFT+VEL+Vdrop which is the sum value of (i) VTFT+VEL determined in the determination (step S13) of the voltage required by the organic EL element 121 and the driving transistor 125 and (ii) the voltage drop margin Vdrop determined in the determination (step S15) of the voltage margin corresponding to the potential difference ΔV.

Lastly, the signal processing circuit 160 regulates the variable-voltage source 180 by setting the first reference voltage Vref1 as VTFT+VEL+Vdrop at the beginning of the next frame period (step S18). With this, in the next frame period, the variable-voltage source 180 supplies Vout=VTFT+VEL+Vdrop to the organic EL display unit 110. It is to be noted that step 16 to step S18 correspond to the voltage regulating process according to the present invention.

In this manner, the display device 100 according to the present embodiment includes: the variable-voltage source 180 which outputs the high potential and the low potential; the potential difference detecting circuit 170 which measures, for the monitor luminescent pixel 111M in the organic EL display unit 110, (i) the high potential to be applied to the monitor luminescent pixel 111M and (ii) the high output voltage Vout of the variable-voltage source 180; and the signal processing circuit 160 which regulates the variable-voltage source 180 so as to set, to the predetermined potential (VTFT+VEL), the high potential that is applied to the monitor luminescent pixel 111M that is measured by the potential difference detecting circuit 170. Furthermore, the potential difference detecting circuit 170, in addition, measures the high output voltage Vout of the variable-voltage source 180, detects the potential difference between the measured high output voltage Vout and the high potential to be applied to the monitor luminescent pixel 111M. The signal processing circuit 160 regulates the variable-voltage source 180 in accordance with the potential difference detected by the potential difference detecting circuit 170.

With this, the display device 100 can reduce excess voltage and reduce power consumption by detecting the voltage drop caused by the horizontal-direction first power source wire resistance R1*h* and a vertical-direction first power source wire resistance R1*v* and giving feedback to the variable-voltage source 180 regarding the degree of such voltage drop.

Furthermore, in the display device 100, the monitor luminescent pixel 111M is located near the center of the organic EL display unit 110, and thus the output voltage Vout of the variable-voltage source 180 can be easily regulated even when the size of the organic EL display unit 110 is increased.

Furthermore, since heat generation by the organic EL element 121 is suppressed through the reduction of power consumption, the deterioration of the organic EL element 121 can be prevented.

Next, the display pattern transition in the case where the video data inputted up to the Nth frame changes from the N+1th frame onward, in the display device 100 described above, shall be described using FIG. 8 and FIG. 9.

Initially, the video data that is assumed to have been inputted in the Nth frame and the N+1th frame shall be described.

First, it is assumed that, up to the Nth frame, the video data corresponding to the central part of the organic EL display unit 110 is a peak gradation (R:G:B=255:255:255) in which the central part of the organic EL display unit 110 is seen as being white. On the other hand, it is assumed that the video data corresponding to a part of the organic EL display unit 110 other than the central part is a gray gradation (R:G:B=50:50:50) in which the part of the organic EL display unit 110 other than the central part is seen as being gray.

Furthermore, from the N+1th frame onward, it is assumed that the video data corresponding to the central part of the organic EL display unit 110 is the peak gradation (R:G:B=255:255:255) as in the Nth frame. On the other hand, it is assumed that the video data corresponding to the part of the organic EL display unit 110 other than the central part is a gray gradation (R:G:B=150:150:150) that can be seen as a brighter gray than in the Nth frame.

Next, the operation of the display device 100 in the case where video data as described above is inputted in the Nth frame and the N+1th frame shall be described.

Figure 8:
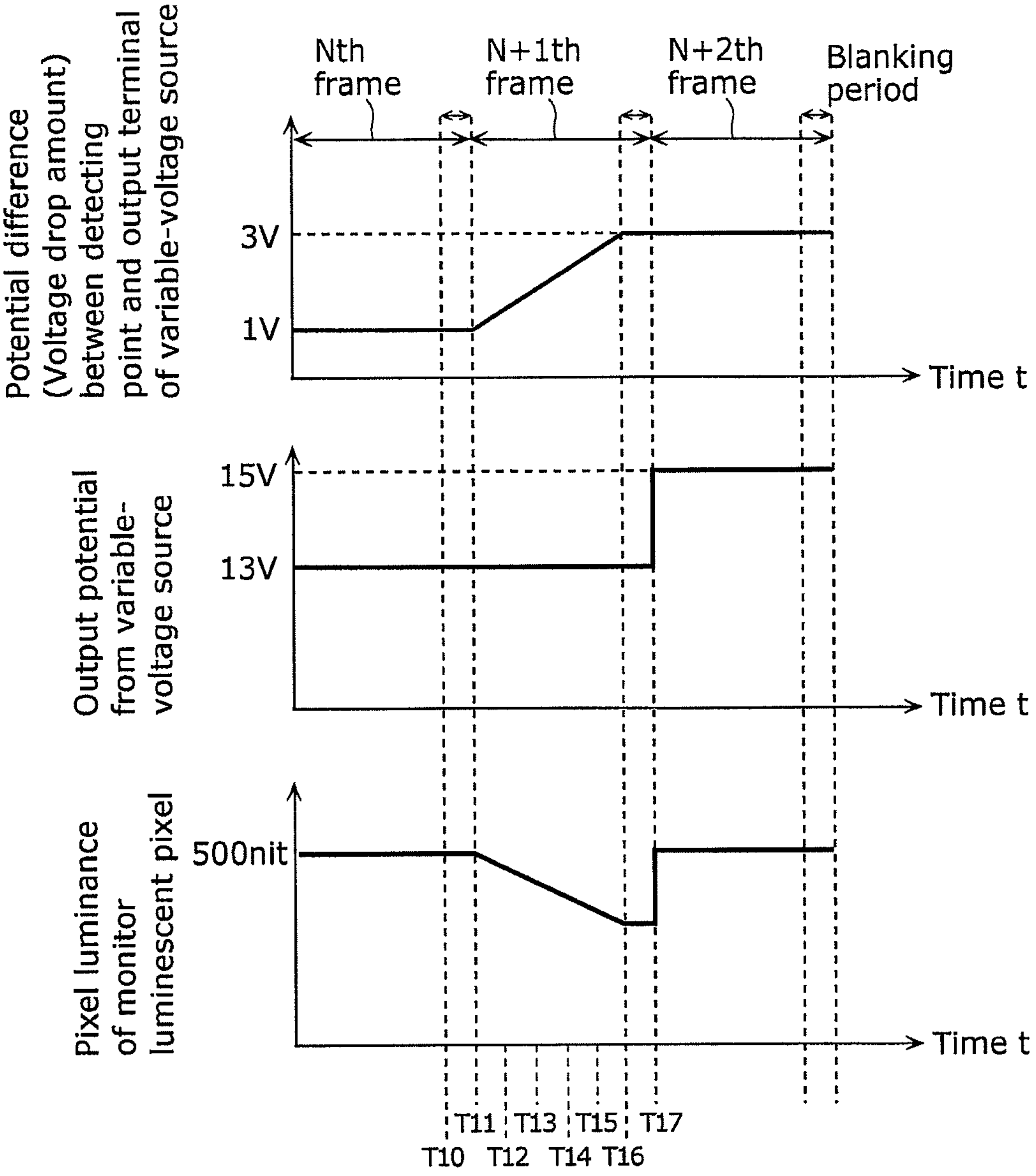
FIG. 8 is a timing chart showing the operation of the display device from an Nth frame to an N+2th frame.

FIG. 8 is a timing chart showing the operation of the display device 100 from the Nth frame to the N+2th frame.

The potential difference ΔV detected by the potential difference detecting circuit 170, the output voltage from the variable-voltage source 180, and the pixel luminance of the monitor luminescent pixel 111M are shown in the figure. Furthermore, a blanking period is provided at the end of each frame period.

Figure 9:
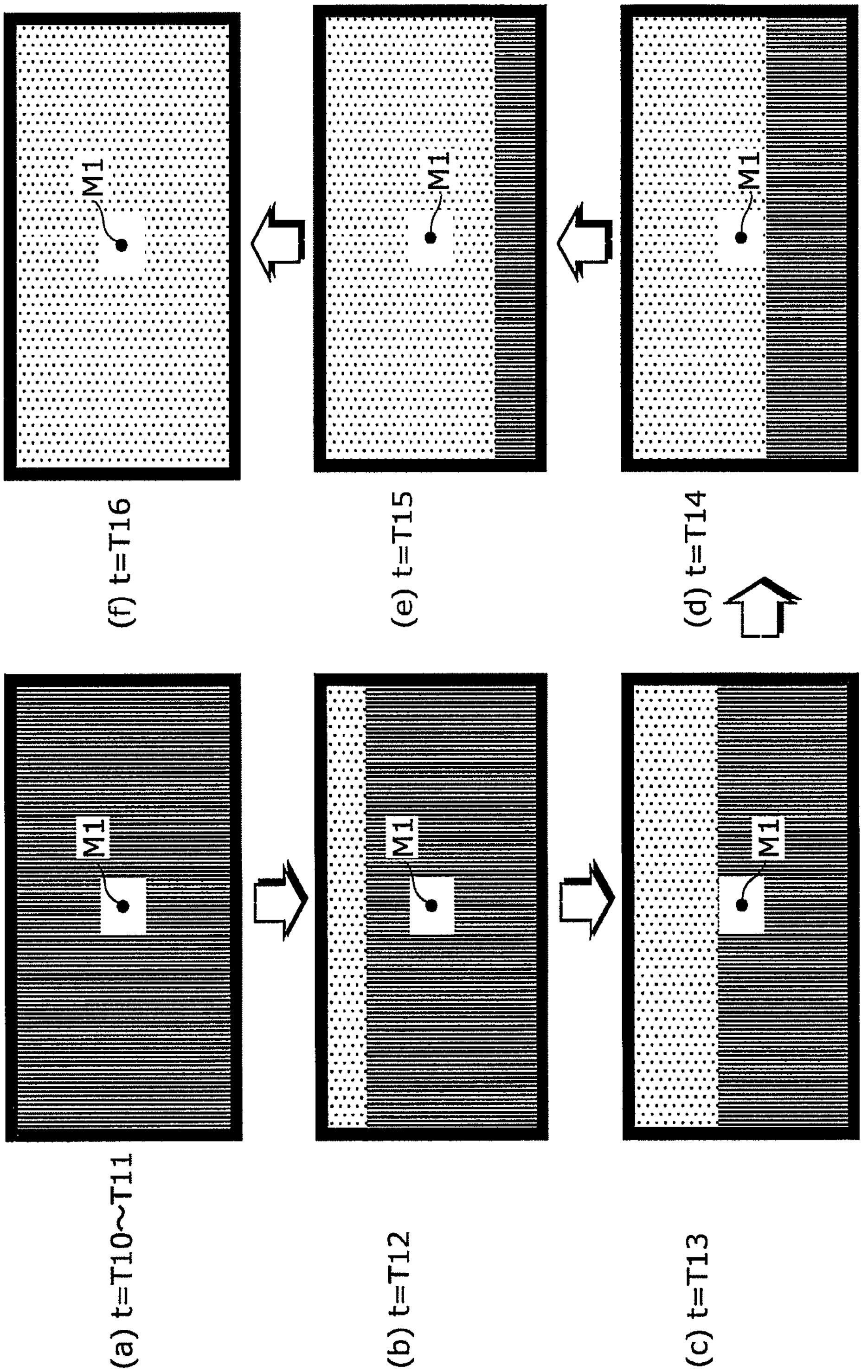
FIG. 9 is diagram schematically showing images displayed on the organic EL display unit.

FIG. 9 is diagram schematically showing images displayed on the organic EL display unit.

In time t=T10, the peak signal detecting circuit 150 detects the peak value of the video data of the Nth frame. The signal processing circuit 160 determines VTFT+VEL from the peak value detected by the peak signal detecting circuit 150. Here, since the peak value of the video data of the Nth frame is R:G:B=255:255:255, the signal processing circuit 160 uses the required voltage conversion table and determines the required voltage VTFT+VEL for the N+1th frame to be, for example, 12.2V.

On the other hand, at this time the potential difference detecting circuit 170 detects the potential at the detecting point M1 via the monitor wire 190, and detects the potential difference ΔV between the detected potential and the output voltage Vout outputted by the variable-voltage source 180. For example, in time t=T10, the potential difference detecting circuit 170 detects ΔV=1V. Subsequently, the signal processing circuit 160 uses the voltage margin conversion table and determines the voltage drop margin Vdrop for the N+1th frame to be 1V.

The time t=T10 to T11 is the blanking period of the Nth frame. In this period, an image which is the same that in time t=T10 is displayed in the organic EL display unit 110.

(a) in FIG. 9 schematically shows an image displayed on the organic EL display unit 110 in time t=T10 to T11. In this period, the image displayed on the organic EL display unit 110 corresponds to the image data of the Nth frame, and thus the central part is white and the part other than the central part is gray.

In time t=T11, the signal processing circuit 160 sets the potential of the first reference voltage Vref1 as the sum VTFT+VEL+Vdrop (for example, 13.2V) of the determined required voltage VTFT+VEL and the voltage drop margin Vdrop.

Over a time t=T11 to T16, the image corresponding to the video data of the N+1th frame is gradually displayed on the organic EL display unit 110 ((b) to (f) in FIG. 9). At this time, the output voltage Vout from the variable-voltage source 180 is, at all times, the VTFT+VEL+Vdrop set to the voltage of the first reference voltage Vref1 in time t=T11. However, the video data corresponding to the part of the organic EL display unit 110 other than the central part is a gray gradation that can be seen as a gray that is brighter than that in the Nth frame. Therefore, the amount of current supplied by the variable-voltage source 180 to the organic EL display unit 110 gradually increases over a time T11 to T16, and the voltage drop in the first power source wire 112 gradually increases following this increase in the amount of current. With this, there is a shortage of power source voltage for the luminescent pixels 111 in the central part of the organic EL display unit 110, which are the luminescent pixels 111 in a brightly displayed region. Stated differently, luminance drops below the image corresponding to the video data R:G:B=255:255:255 of the N+1th frame. Specifically, over the time t=T11 to T16, the luminescence luminance of the luminescent pixels 111 at the central part of the organic EL display unit 110 gradually drops.

Next, in time t=T16, the peak signal detecting circuit 150 detects the peak value of the video data of the N+1th frame. Here, since the detected peak value of the video data of the N+1th frame is R:G:B=255:255:255, the signal processing circuit 160 determines the required voltage VTFT+VEL for the N+2th frame to be, for example, 12.2V.

Meanwhile, the potential difference detecting circuit 170 detects the potential at the detecting point M1 via the monitor wire 190, and detects the potential difference ΔV between the detected potential and the output voltage Vout being outputted by the variable-voltage source 180. For example, in time t=T16, the potential difference detecting circuit 170 detects ΔV=3V. Subsequently, the signal processing circuit 160 uses the voltage margin conversion table and determines the voltage drop margin Vdrop for the N+2th frame to be 3V.

Next, in time t=T17, the signal processing circuit 160 sets the voltage of the first reference voltage Vref1 to the sum VTFT+VEL+Vdrop (for example, 15.2V) of the determined required voltage VTFT+VEL and the voltage drop margin Vdrop. Therefore, from time t=T17 onward, the potential at the detecting point M1 becomes VTFT+VEL which is the predetermined potential.

In this manner, in the display device 100, although luminance temporarily drops in the N+1th frame, this is a very short period and thus has practically no impact on the user.

Second Embodiment

A display device according to the present embodiment is nearly the same as the display device 100 according to the first embodiment but is different in not including the potential difference detecting circuit 170 and in having the potential at the detecting point M1 inputted to the variable-voltage source. Furthermore, the signal processing circuit is different in setting the voltage to be outputted to the variable-voltage source to the required voltage VTFT+VEL. With this, in the display device according to the present embodiment, the output voltage Vout of the variable-voltage source can be regulated in real-time in accordance with the voltage drop amount, and thus, compared with the first embodiment, the temporary drop in pixel luminance can be prevented.

Figure 10:
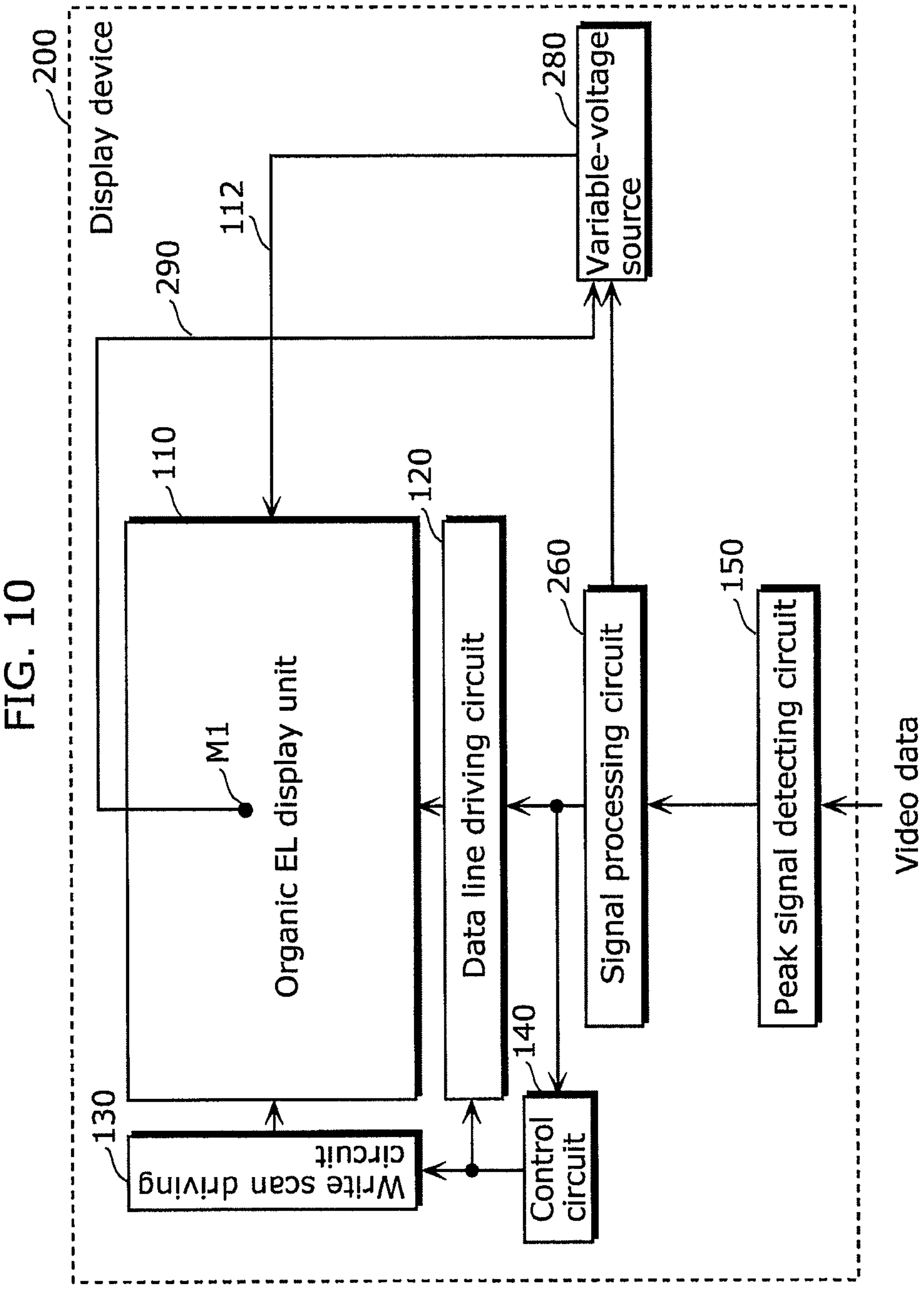
FIG. 10 is a block diagram showing the schematic configuration of a display device according to a second embodiment.

FIG. 10 is a block diagram showing the schematic configuration of the display device according to the present embodiment.

A display device 200 according to the present embodiment shown in the figure is different compared to the display device 100 according to the first embodiment shown in FIG. 1 in not including the potential difference detecting circuit 170, and including a monitor wire 290 in place of the monitor wire 190, a signal processing circuit 260 in place of the signal processing circuit 160, and a variable-voltage source 280 in place of the variable-voltage source 180.

The signal processing circuit 260 determines a second reference voltage Vref2 to be outputted to the variable-voltage source 280, from the peak signal outputted by the peak signal detecting circuit 150. Specifically, the signal processing circuit 260 uses the required voltage conversion table and determines the sum VTFT+VEL of the voltage VEL required by the organic EL element 121 and the voltage VTFT required by the driving transistor 125. Subsequently, the signal processing circuit 260 sets the determined VTFT+VEL as the voltage of the second reference voltage Vref2.

In such manner, the second reference voltage Vref2 that is outputted to the variable-voltage source 280 by the signal processing circuit 260 of the display device 200 according to the present invention is different from the first reference voltage Vref1 that is outputted to the variable-voltage source 180 by the signal processing circuit 160 of the display device 100 according to the present invention, and is a voltage determined in accordance with video data only. Specifically, the second reference voltage Vref2 is not dependent on the potential difference ΔV between the potential of the output voltage Vout of the variable-voltage source 280 and the potential at the detecting point M1.

The variable-voltage source 280 measures the high potential applied to the monitor luminescent pixel 111M, via the monitor wire 290. Specifically, the variable-voltage source 280 measures the potential at the detecting point M1. Subsequently, the variable-voltage source 280 regulates the output voltage Vout in accordance with the detected potential at the detecting point M1 and the second reference voltage Vref2 outputted by the signal processing circuit 260.

The monitor wire 290 has one end connected to the detecting point M1 and the other end connected to the variable-voltage source 280, and transmits the potential at the detecting point M1 to the variable-voltage source 280.

Figure 11:
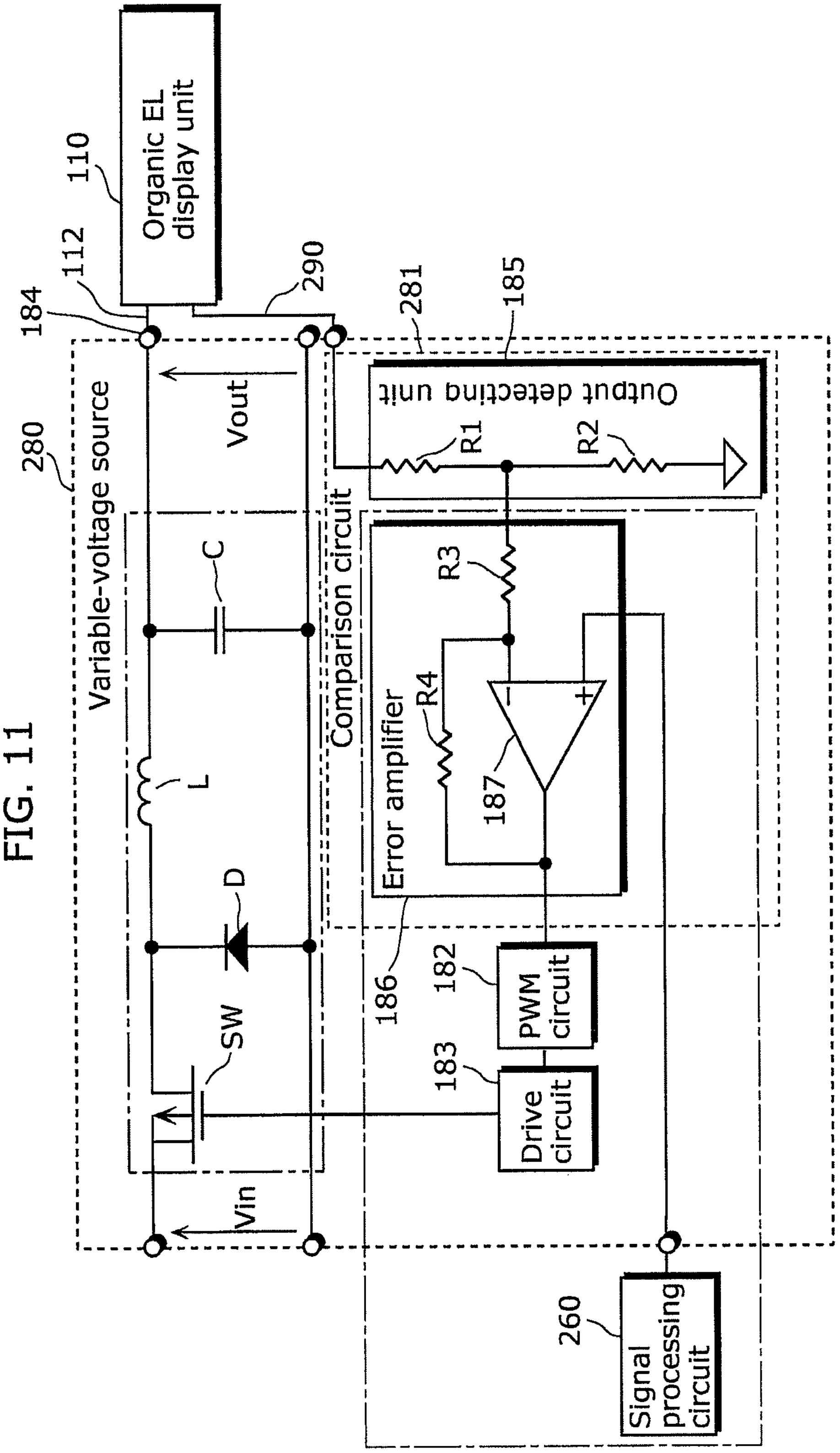
FIG. 11 is a block diagram showing an example of a specific configuration of a variable voltage source.

FIG. 11 is a block diagram showing an example of the specific configuration of the variable-voltage source 280. It is to be noted that the organic EL display unit 110 and the signal processing circuit 260 which are connected to the variable-voltage source are also shown in the figure.

The variable-voltage source 280 shown in the figure has nearly the same configuration as the variable-voltage source 180 shown in FIG. 4 but is different in including, in place of the comparison circuit 181, a comparison circuit 281 which compares the potential at the detecting point M1 and the potential of the second reference voltage Vref2.

Here, assuming that the output potential of the variable-voltage source 280 is Vout, and the voltage drop amount from the output terminal 184 of the variable-voltage source 280 to the detecting point M1 is ΔV, the potential at the detecting point M1 becomes Vout−ΔV. Specifically, in the present embodiment, the comparison circuit 281 compares Vref2 and Vout−ΔV. As described above, since Vref2=VTFT+VEL, it can be said that the comparison circuit 281 is comparing VTFT+VEL and Vout−ΔV.

On the other hand, in the first embodiment, the comparison circuit 181 compares Vref1 and Vout. As described above, since Vref1=VTFT+VEL+ΔV, it can be said that, in the first embodiment, the comparison circuit 181 is comparing VTFT+VEL+ΔV and Vout.

Therefore, although the comparison circuit 281 has different comparison subjects as the comparison circuit 181, the comparison result is the same. Specifically, between the first embodiment and the second embodiment, when the voltage drop amount from the output terminal 184 of the variable-voltage source to the detecting point M1 is the same, the voltage outputted by the comparison circuit 181 to the PWM circuit and the voltage outputted by the comparison circuit 281 to the PWM circuit are the same. As a result, the output voltage Vout of the variable-voltage source 180 and the output voltage Vout of the variable-voltage source 280 become the same. Furthermore, the potential difference ΔV and the output voltage Vout also have an increasing function relationship in the second embodiment.

Compared to the display device 100 according to the first embodiment, the display device 200 configured in the above manner can regulate the output voltage Vout in accordance with the potential difference ΔV between the output terminal 184 and the detecting point M1 in real-time. This is because, in the display device 100 according to the first embodiment, the signal processing circuit 160 changes the first reference voltage Vref1 for a frame only at the beginning of each frame period. Whereas, in the display device 200 according to the present embodiment, Vout can be regulated independently of the control by the signal processing circuit 260, by inputting the voltage that is dependent on the ΔV, that is Vout−ΔV, directly to the comparison circuit 281 of the variable-voltage source 280 without passing through the signal processing circuit 260.

Next, the operation of the display device 200 configured in the above manner, in the case where the video data inputted up to the Nth frame changes from the N+1th frame onward, as in the first embodiment, shall be described. It is to be noted that, as in the first embodiment, it is assumed that, up to the Nth frame, the inputted video data is R:G:B=255:255:255 for the central part of the organic EL display unit 110 and is R:G:B=50:50:50 for the part other than the central part, and, from the N+1th frame onward, the inputted video data is R:G:B=255:255:255 for the central part of the organic EL display unit 110 and is R:G:B=150:150:150 for the part other than the central part.

Figure 12:
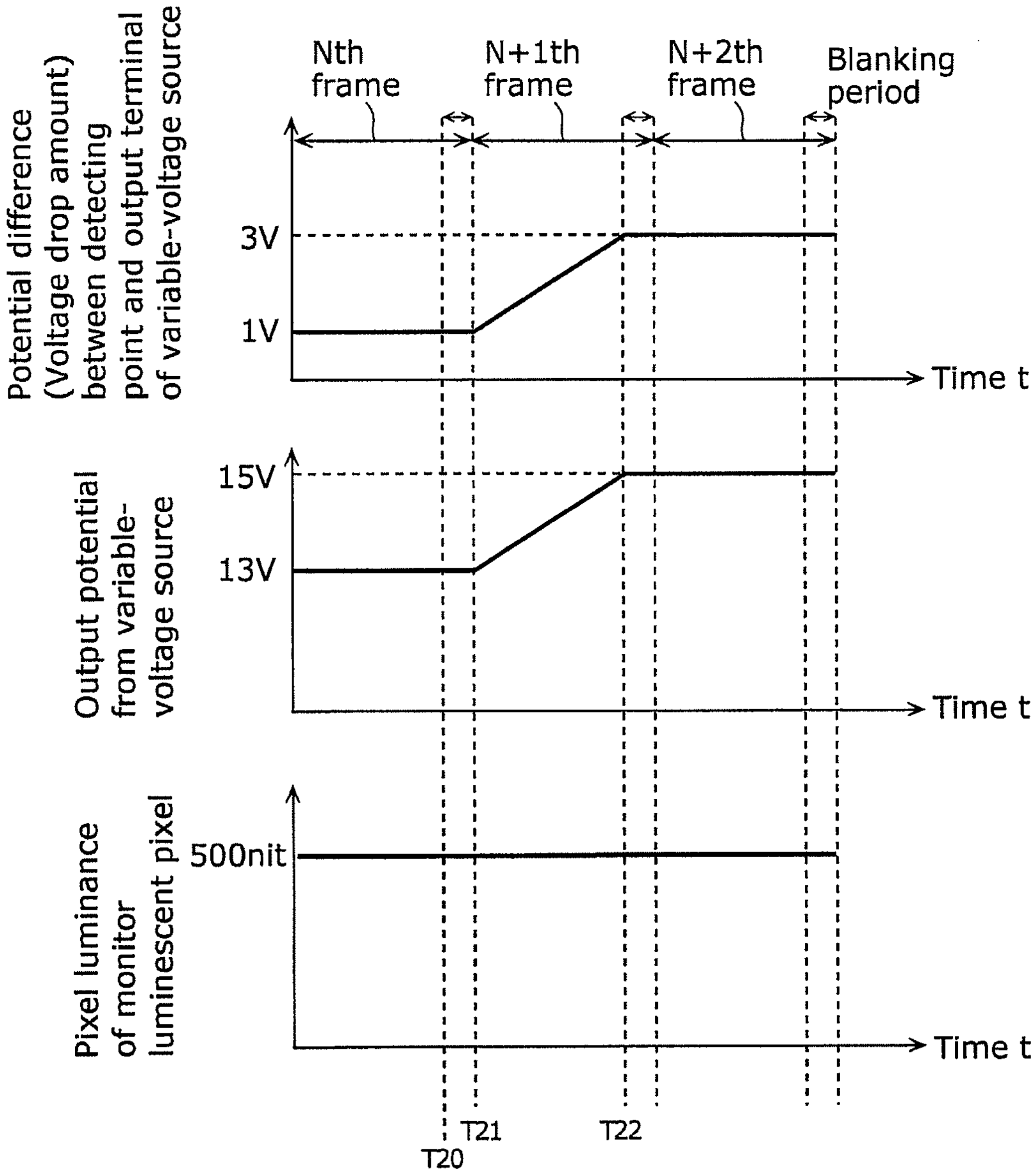
FIG. 12 is a timing chart showing the operation of the display device from an Nth frame to an N+2th frame.

FIG. 12 is a timing chart showing the operation of the display device 200 from the Nth frame to the N+2th frame.

In time t=T20, the peak signal detecting circuit 150 detects the peak value of the video data of the Nth frame. The signal processing circuit 260 determines VTFT+VEL from the peak value detected by the peak signal detecting circuit 150. Here, since the peak value of the video data of the Nth frame is R:G:B=255:255:255, the signal processing circuit 260 uses the required voltage conversion table and determines the required voltage VTFT+VEL for the N+1th frame to be, for example, 12.2V.

Meanwhile, the output detecting unit 185 constantly detects the potential at the detecting point M1, via the monitor wire 290.

Next, in time t=T21, the signal processing circuit 260 sets the voltage of the second reference voltage Vref2 to the determined required voltage VTFT+VEL (for example, 12.2V).

Over a time t=T21 to T22, the image corresponding to the video data of the N+1th frame is gradually displayed on the organic EL display unit 110. At this time, the amount of current supplied by the variable-voltage source 280 to the organic EL display unit 110 gradually increases, as described in the first embodiment. Therefore, following the increase in the amount of current, the voltage drop in the first power source wire 112 gradually increases. Specifically, the potential at the detecting point M1 gradually drops. Stated differently, the potential difference ΔV between the potential of the output voltage Vout and the potential at the detecting point M1 gradually increases.

Here, since the error amplifier 186 outputs, in real-time, a voltage that is in accordance with the potential difference between VTFT+VEL and Vout−ΔV, the error amplifier 186 outputs a voltage that causes Vout to rise in accordance with the increase in the potential difference ΔV.

Therefore, with the variable-voltage source 280, Vout rises in real-time in accordance with the potential difference ΔV.

This resolves the shortage of power source voltage for the luminescent pixels 111 in the central part of the organic EL display unit 110 which are the luminescent pixels 111 in the brightly displayed region. In other words, the drop in pixel luminance is resolved.

As described above, in the display device 200 according to the present embodiment, the signal processing circuit 260, and the error amplifier 186, the PWM circuit 182, and the drive circuit 183 of the variable-voltage source 280, detect the potential difference between the high potential of the monitor luminescent pixel 111 measured by the output detecting unit 185 and the predetermined potential, and regulates the switching element SW in accordance with the detected potential difference. Accordingly, compared with the display device 100 according to the first embodiment, the display device 200 according to the present embodiment is able to regulate the output voltage Vout of the variable-voltage source 280 in real-time in accordance with the voltage drop amount, and thus, compared with the first embodiment, the temporary drop in pixel luminance can be prevented.

It is to be noted that, in the present embodiment, the organic EL display unit 110 is the display unit according to the present invention; the output detecting unit 185 is the voltage measuring unit according to the present invention; the signal processing circuit 260, and the error amplifier 186, the PWM circuit 182, and the drive circuit 183 of the variable-voltage source 280 which are surrounded by the dashed-and-single-dotted line in FIG. 11 are the voltage regulating unit according to the present invention; and the switching element SW, the diode D, the inductor L, and the capacitor C which are surrounded by the dashed-and-double-dotted line in FIG. 11 are the power supplying unit according to the present invention.

Third Embodiment

A display device according to the present embodiment is nearly the same as the display device 100 according to the first embodiment but is different in measuring the high potential of each of two or more luminescent pixels 111, detecting the potential difference between each of the measured potentials and the potential of the output voltage of the variable-voltage source 180, and regulating the variable-voltage source 180 in accordance with the largest potential difference out of the detection results.

With this, the output voltage Vout of the variable-voltage source 180 can be more appropriately regulated. Therefore, power consumption can be effectively reduced even when the size of the organic EL display unit is increased.

Figure 13:
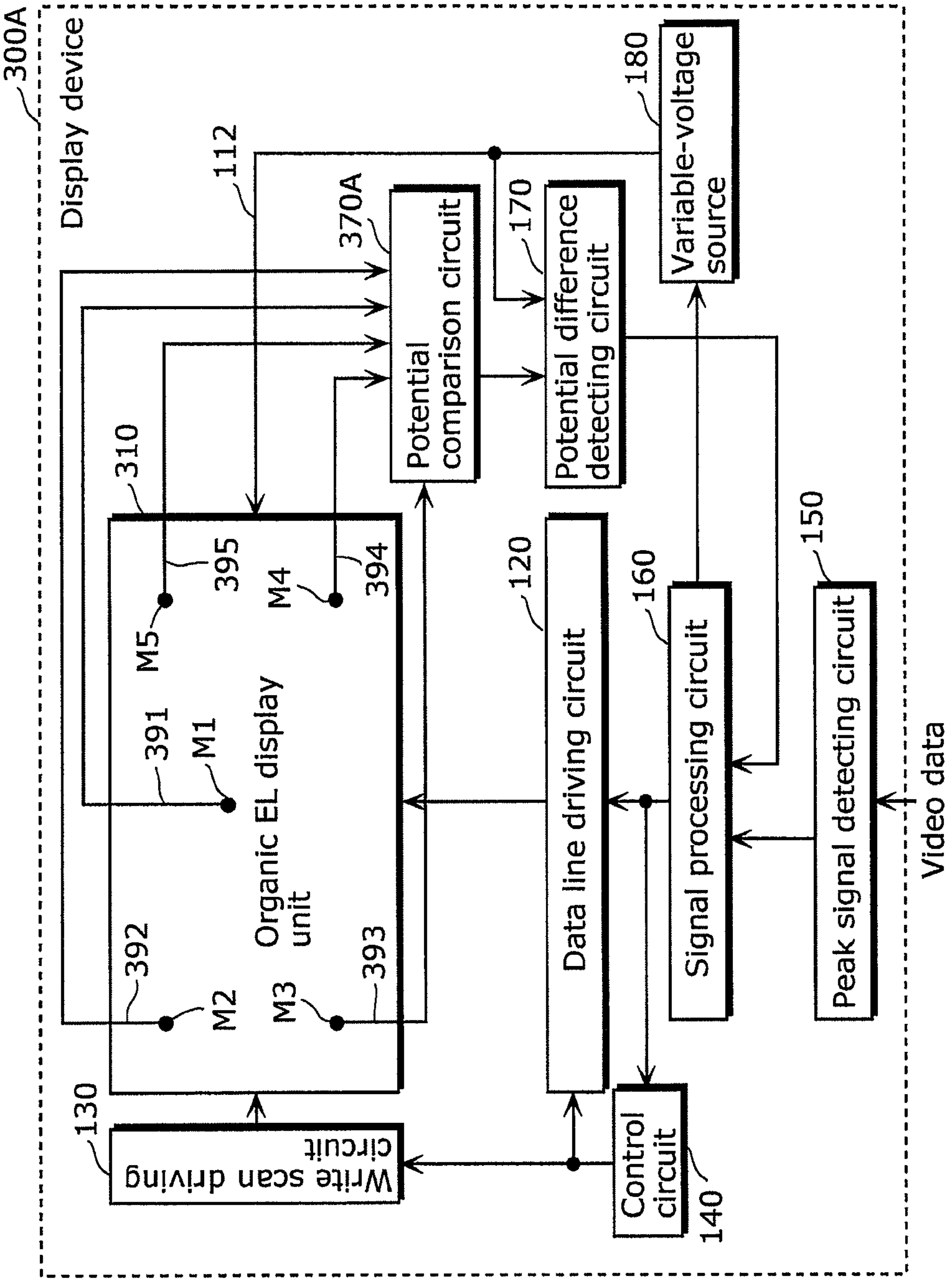
FIG. 13 is a block diagram showing an example of the schematic configuration of a display device according to a third embodiment.

FIG. 13 is a block diagram showing an example of the schematic configuration of the display device according to the present embodiment.

A display device 300A according to the present embodiment shown in the figure is nearly the same as the display device 100 according to the first embodiment shown in FIG. 1 but is different compared to the display device 100 in further including a potential comparison circuit 370A, and in including an organic EL display unit 310 in place of the organic EL display unit 110, and monitor wires 391 to 395 in place of the of the monitor wire 190.

The organic EL display unit 310 is nearly the same as the organic EL display unit 110 but is different compared to the organic EL display unit 110 in the placement of the monitor wires 391 to 395 which are provided, on a one-to-one correspondence with detecting points M1 to M5, for measuring the potential at the corresponding detecting point.

It is preferable to provide the detecting points M1 to M5 evenly inside the organic EL display unit 310; for example, at the center of the organic EL display unit 310 and at the center of each region obtained by dividing the organic EL display unit 310 into four as shown in FIG. 13. It is to be noted that although the five detecting points M1 to M5 are illustrated in the figure, having even two or three detecting points is sufficient, as long as there are plural detecting points.

Each of the monitor wires 391 to 395 is connected to the corresponding one of the detecting points M1 to M5 and to the potential comparison circuit 370A, and transmits the potential of the corresponding one of the detecting points M1 to M5. With this, the potential comparison circuit 370A can measure the potentials at the detecting points M1 to M5 via the monitor wires 391 to 395.

The potential comparison circuit 370A measures the potentials at the detecting points M1 to M5 via the monitor wires 391 to 395. Stated differently, the potential comparison circuit 370A measures the high potential applied to plural monitor luminescent pixels 111M. In addition, the potential comparison circuit 370A selects the lowest potential among the measured potentials at the detecting points M1 to M5, and outputs the selected potential to the potential difference detecting circuit 170.

The potential difference detecting circuit 170, as in the first embodiment, detects the potential difference ΔV between the inputted potential and the output voltage Vout of the variable-voltage source 180, and outputs the detected potential difference ΔV to the signal processing circuit 160.

Therefore, the signal processing circuit 160 regulates the variable-voltage source 180 based on the potential selected by the potential comparison circuit 370A. As a result, the variable-voltage source 180 outputs, to the organic EL display unit 310, an output voltage Vout with which dropping of luminance does not occur in any of the monitor luminescent pixels 111M.

As described above, in the display device 300A according to the present embodiment, the potential comparison circuit 370A measures the high potential to be applied to each of plural luminescent pixels 111 inside the organic EL display unit 310, and selects the lowest potential among the measured potentials of the luminescent pixels 111. In addition, the potential difference detecting circuit 170 detects the potential difference ΔV between the lowest potential selected by the potential comparison circuit 370A and the potential of the output voltage Vout of the variable-voltage source 180. Then, the signal processing circuit 160 regulates the variable-voltage source 180 in accordance with the detected potential difference ΔV.

It is to be noted that, in the display device 300A according to the present embodiment: the variable-voltage source 180 is the power supplying unit according to the present invention; the organic EL display unit 310 is the display unit according to the present invention; one part of the potential comparison circuit 370A is the voltage measuring unit according to the present invention; and the other part of the potential comparison circuit 370A, the potential difference detecting circuit 170, and the signal processing circuit 160 are the voltage regulating unit according to the present invention.

Furthermore, although the potential comparison circuit 370A and the potential difference detecting circuit 170 are provided separately in the display device 300A, a potential comparison circuit which compares the potential of the output voltage Vout of the variable-voltage source 180 and the potential at each of the detecting points M1 to M5 may be provided in place of the potential comparison circuit 370A and the potential difference detecting circuit 170.

Figure 14:
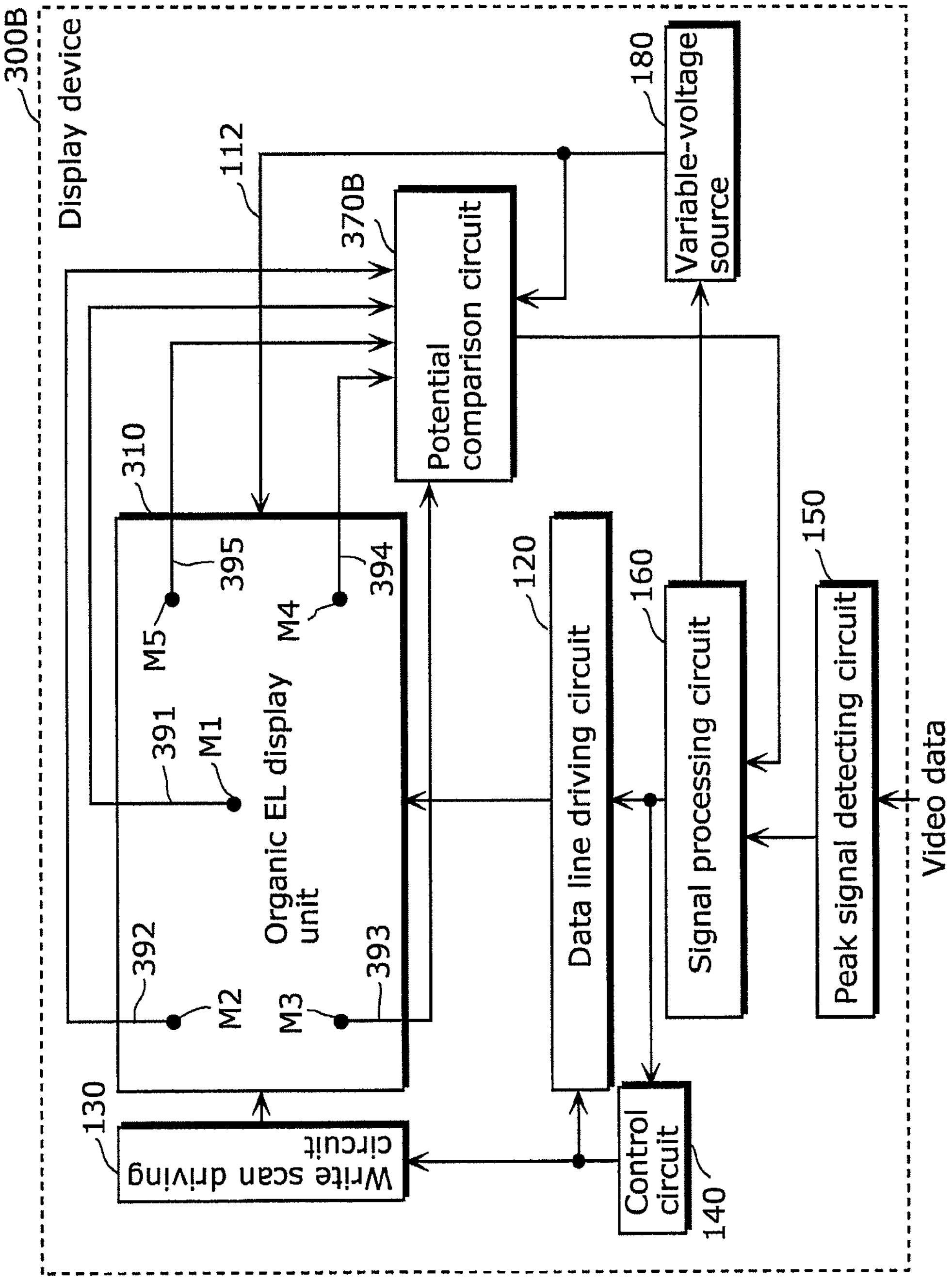
FIG. 14 is a block diagram showing another example of the schematic configuration of a display device according to the third embodiment.

FIG. 14 is a block diagram showing another example of the schematic configuration of a display device according to the third embodiment.

Although having nearly the same configuration as the display device 300A shown in FIG. 13, the display device 300B shown in the figure is different in including a potential comparison circuit 370B in place of the potential comparison circuit 370A and the potential difference detecting circuit 170.

The potential comparison circuit 370B detects potential differences corresponding to the detecting points M1 to M5 by comparing the potential of the output voltage Vout of the variable-voltage source 180 and the potential at each of the detecting points M1 to M5. Subsequently, the potential comparison circuit 370B selects the largest potential difference out of the detected potential differences, and outputs the potential difference ΔV, which is the largest potential difference, to the signal processing circuit 160.

The signal processing circuit 160 regulates the variable-voltage source 180 in the same manner as the signal processing circuit 160 of the display apparatus 300A.

It is to be noted that, in the display device 300B: the variable-voltage source 180 is the power supplying unit according to the present invention; the organic EL display unit 310 is the display unit according to the present invention; one part of the potential comparison circuit 370B is the voltage measuring unit according to the present invention; and the other part of the potential comparison circuit 370B and the signal processing circuit 160 are the voltage regulating unit according to the present invention.

As described above, the display devices 300A and 300B according to the present embodiment supply, to the organic EL display unit 310, an output voltage Vout with which dropping of luminance does not occur in any of the monitor luminescent pixels 111M. In other words, by setting the output voltage Vout to a more appropriate value, power consumption is further reduced and the dropping of luminance of the luminescent pixel 111 is suppressed. Hereinafter, this effect shall be described using FIG. 15A to FIG. 16B.

Figure 15A:
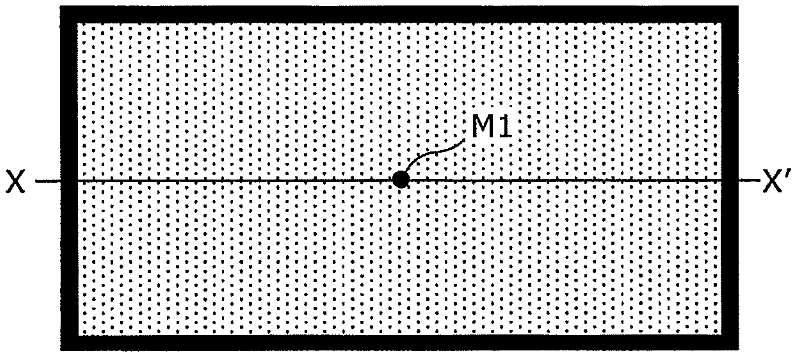
FIG. 15A is diagram schematically showing an example of an image displayed on the organic EL display unit.
Figure 15B:
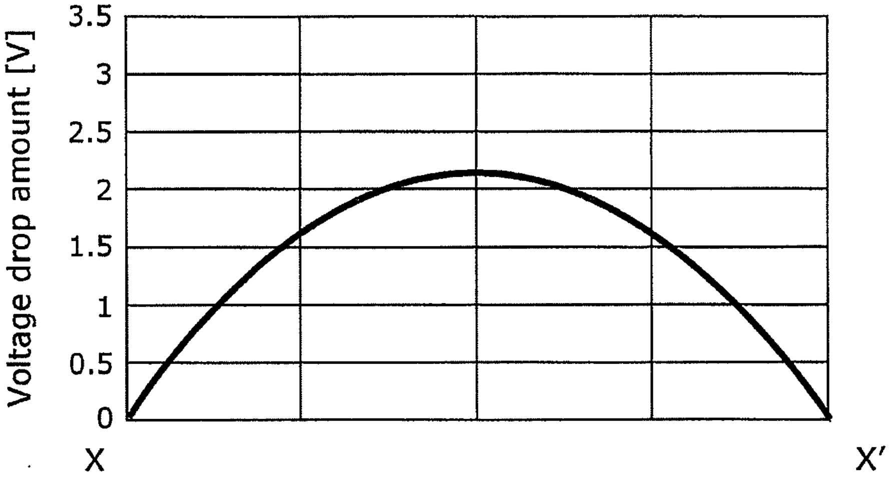
FIG. 15B is a graph showing the voltage drop amount for a first power source wire in line x-x' in the case of the image shown in FIG. 15A.

FIG. 15A is a diagram schematically showing an example of an image displayed on the organic EL display unit 310, and FIG. 15B is a graph showing the voltage drop amount for the first power source wire 112 in line x-x' in the case of the image shown in FIG. 15A. Furthermore, FIG. 16A is a diagram schematically showing another example of an image displayed on the organic EL display unit 310, and FIG. 16B is a graph showing the voltage drop amount for the first power source wire 112 in line x-x' in the case of the image shown in FIG. 16A.

As shown in the FIG. 15A, when all of the luminescent pixels 111 of the organic EL display unit 310 produce luminescence at the same luminance, the voltage drop amount for the first power source wire 112 is as shown in FIG. 15B.

Therefore, the worst case for the voltage drop can be known by checking the potential at the detecting point M1 at the center of the screen. Therefore, by adding the voltage drop margin Vdrop corresponding to the voltage drop amount ΔV of the detecting point M1 to VTFT+VEL, it is possible to cause all of the luminescent pixels 111 inside the organic EL display unit 310 to produce luminescence at a precise luminance.

Figure 16A:
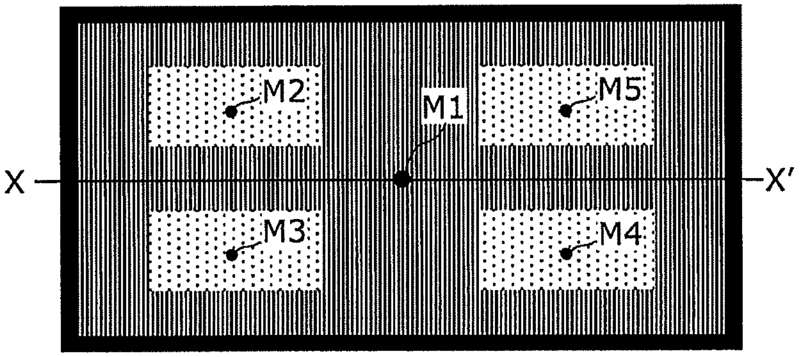
FIG. 16A is diagram schematically showing and example of an image displayed on the organic EL display unit.
Figure 16B:
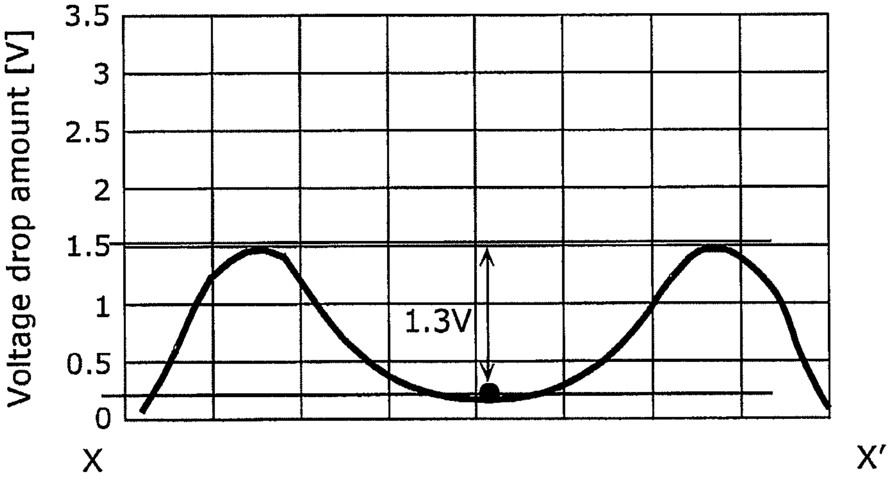
FIG. 16B is a graph showing the voltage drop amount for the first power source wire in line x-x' in the case of the image shown in FIG. 16A.

On the other hand, as shown in the FIG. 16A, when the luminescent pixels 111 at the central part of regions obtained when the screen is divided in two in the vertical direction and divided in two in the horizontal direction, that is, regions obtained by dividing the screen into four, produce luminescence at the same luminance and the other luminescent pixels 111 do not produce luminescence, the voltage drop amount for the first power source wire 112 is as shown in FIG. 16B.

Therefore, when measuring only the potential at the detecting point M1 at the center of the screen, it is necessary to set, as the voltage drop margin, a voltage obtained by adding a certain offset potential to the detected potential. For example, by pre-setting the voltage margin conversion table such that a voltage obtained by always adding an offset of 1.3V to the voltage drop amount (0.2V) at the center of the screen is set as the voltage drop margin Vdrop, it is possible to cause all of the luminescent pixels 111 inside the organic EL display unit 310 to produce luminescence at a precise luminance. Here, producing luminescence at a precise luminance means that the driving transistor 125 of the luminescent pixel 111 is operating in the saturation region.

However, in this case, since 1.3V is always required as a voltage drop margin Vdrop, the power consumption reducing effect is lessened. For example, even in the case of an image in which the actual voltage drop amount is 0.1V, 0.1+1.3=1.4V is held as the voltage drop margin, and thus the output voltage Vout increases by such amount, and the reducing effect on power consumption is lessened.

Consequently, by adopting a configuration which divides the screen into four as shown in FIG. 16A and measures the potential at the detecting points M1 to M5 at the five locations of the center of each of the four regions and the center of the entire screen, it is possible to enhance the accuracy of voltage drop amount detection. Therefore, it is possible to reduce the additional offset amount and increase the power consumption reducing effect.

For example, in the case where the potential at the detecting points M2 to M5 is 1.3V in FIG. 16A and FIG. 16B, by setting, as the voltage drop margin, a voltage obtained by adding an offset of 0.2V to the voltage drop amount at the detecting point M1, it is possible to cause all the luminescent pixels 111 inside the organic EL display unit 310 to produce luminescence at a precise luminance.

In this case, even in the case of an image in which the actual voltage drop amount is 0.1V, the value to be set as the voltage drop margin Vdrop is 0.1+0.2=0.3V, and thus 1.1V of power source voltage can be further reduced compared to when only the potential at the detecting point M1 at the center of the screen is measured.

As described above, compared to the display devices 100 and 200, in the display devices 300A and 300B, there are many detecting points and the output voltage Vout can be regulated in accordance with the largest value out of the measured voltage drop amounts. Therefore, power consumption can be effectively reduced even when the size of the organic EL display unit 310 is increased.

Fourth Embodiment

In the same manner as the display devices 300A and 300B according to the third embodiment, in a display device according to the present embodiment, the high potential for each of plural luminescent pixels 111 is measured, and the potential difference between each of the plural detected potentials and the potential of the output voltage of the variable-voltage source is detected. Subsequently, the variable-voltage source is regulated so that the output voltage of the variable-voltage source changes in accordance with the largest potential difference. However, the display device according to the present embodiment is different compared to the display devices 300A and 300B in that the potential selected in the potential comparison circuit is inputted, not to the signal processing circuit, but to the variable-voltage source.

With this, in the display device according to the present embodiment, the output voltage Vout of the variable-voltage source can be regulated in real-time in accordance with the voltage drop amount, and thus, compared to the display devices 300A and 300B, the temporary drop in pixel luminance can be prevented.

Figure 17:
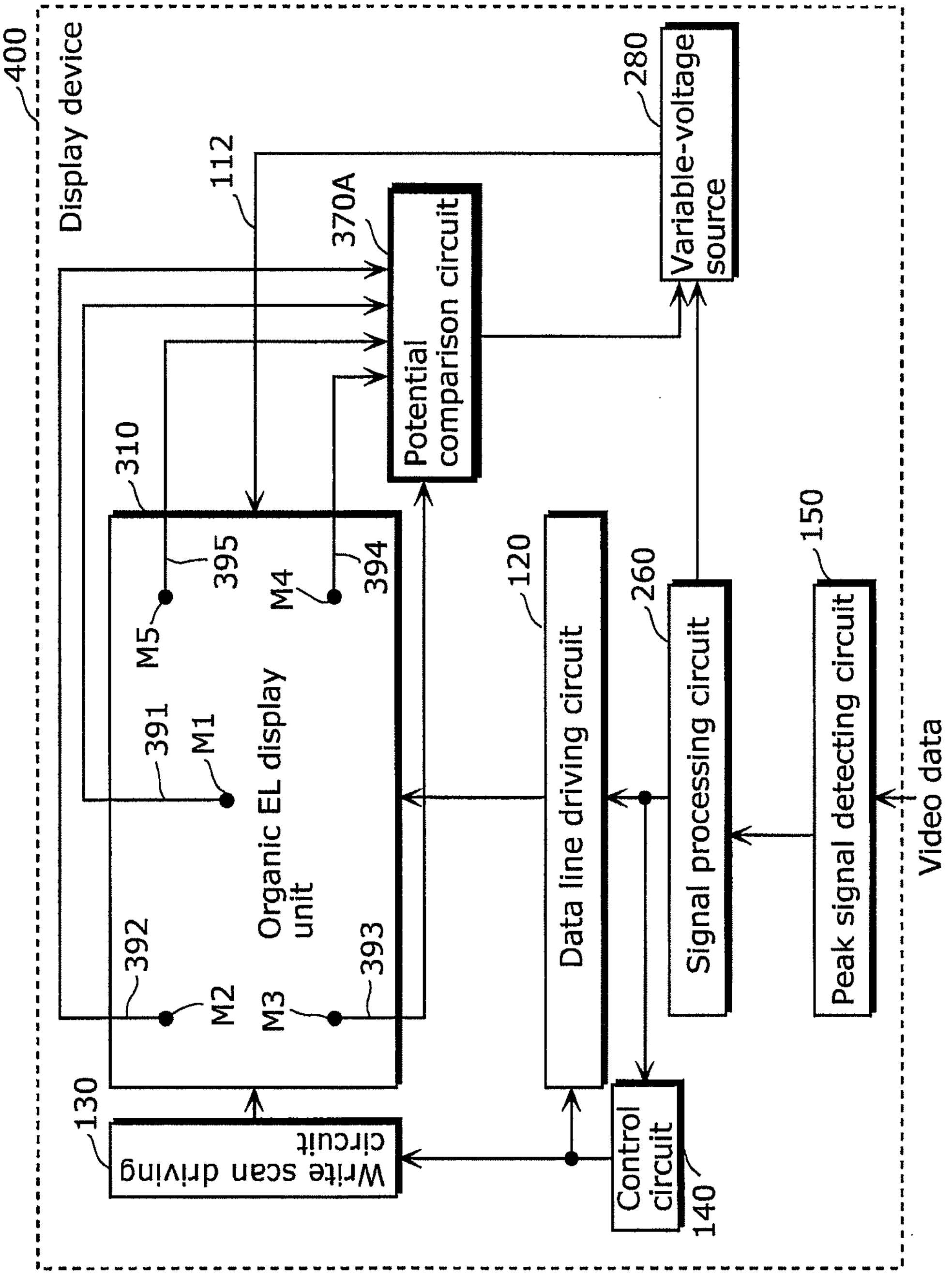
FIG. 17 is a block diagram showing the schematic configuration of a display device according to a fourth embodiment.

FIG. 17 is a block diagram showing the schematic configuration of the display device according to the present embodiment.

A display device 400 in the figure has nearly the same configuration as the display device 300A in the third embodiment but is different in including the variable-voltage source 280 in place of the variable-voltage source 180, the signal processing circuit 260 in place of the signal processing circuit 160, and in not including the potential difference detecting circuit 170 and having the potential selected by the potential comparison circuit 370A inputted to the variable-voltage source 280.

With this, in the variable-voltage source 280, the output voltage Vout rises in real-time in accordance with the lowest voltage selected by the potential comparison circuit 370A.

Therefore, compared to the display devices 300A and 300B, the display device 400 according to the present embodiment can resolve the temporary drop in pixel luminance.

Although the display device according to the present invention has been described thus far based on the embodiments, the display device according to the present invention is not limited to the above-described embodiments. Modifications that can be obtained by executing various modifications to the first to fourth embodiments that are conceivable to a person of ordinary skill in the art without departing from the essence of the present invention, and various devices in which the display device according to the present invention are provided therein are included in the present invention.

For example, the drop in the pixel luminance of the luminescent pixel to which the monitor wire inside the organic EL display unit is provided may be compensated.

Figure 18:
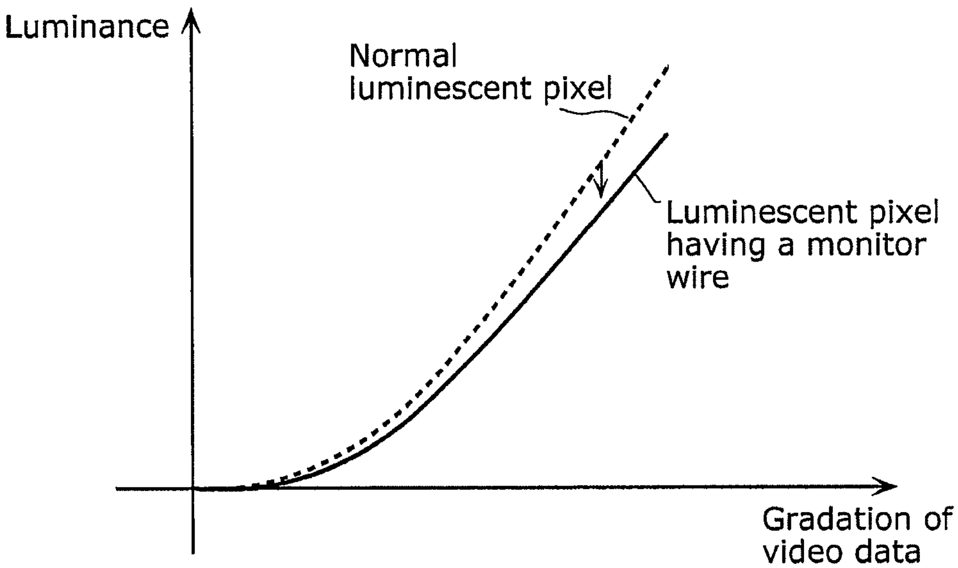
FIG. 18 is a graph showing the pixel luminance of a normal luminescent pixel and the pixel luminance of the luminescent pixel having a monitor wire corresponding to the gradations of the video data.

FIG. 18 is a graph showing the pixel luminance of a normal luminescent pixel and the pixel luminance of the luminescent pixel having the monitor wire corresponding to the gradations of the video data. It is to be noted that a normal luminescent pixel refers to a luminescent pixel among the luminescent pixels of the organic EL display unit, other than a luminescent pixel provided with a monitor wire.

Figure 19:
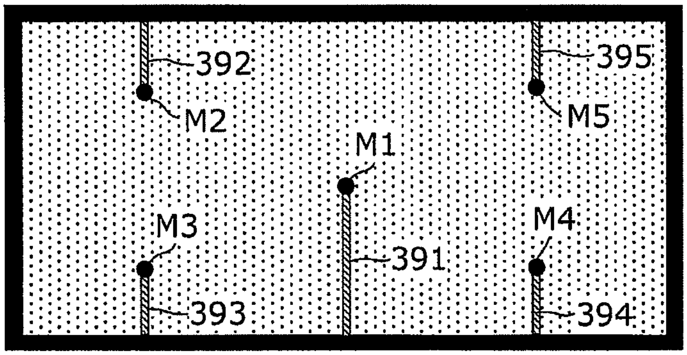
FIG. 19 is a diagram schematically showing an image in which line defects occur.

As is clear from the figure, when the gradations of the video data are the same, the luminance of the luminescent pixels having the monitor wire drops more than the luminance of the normal luminescent pixels. This is because, with the provision of a monitor wire, the capacitance value of the holding capacitor 126 of the luminescent pixel decreases. Therefore, even when video data which causes luminance to be produced with the same luminance evenly throughout the entirety of the organic EL display unit is inputted, the image to be displayed on the organic EL display unit is an image in which the luminance of the luminescent pixels having a monitor wire is lower than the luminance of the other luminescent pixels. In other words, line defects occur. FIG. 19 is a diagram schematically showing an image in which line defects occur. The figure schematically shows, for example, an image displayed on the organic EL display unit 310 when line defects occur in the display device 300A.

In order to prevent line defects, the display device may correct the signal voltage supplied to the organic EL display unit from the data line driving circuit 120. Specifically, since the positions of the luminescent pixels having a monitor wire are known at the time of designing, it is sufficient to pre-set the signal voltage to be provided to the pixels in such locations to be higher by the amount of drop in luminance. With this, it is possible to prevent line defects caused by the provision of monitor wires.

Furthermore, although the signal processing circuits 160 and 260 have the required voltage conversion table indicating the required voltage VTFT+VEL corresponding to the gradations of each color, the signal processing circuits 160 and 260 may have, in place of the required voltage conversion table, the current-voltage characteristics of the driving transistor 125 and the current-voltage characteristics of the organic EL element 121, and may determine VTFT+VEL by using these two current-voltage characteristics.

Figure 20:
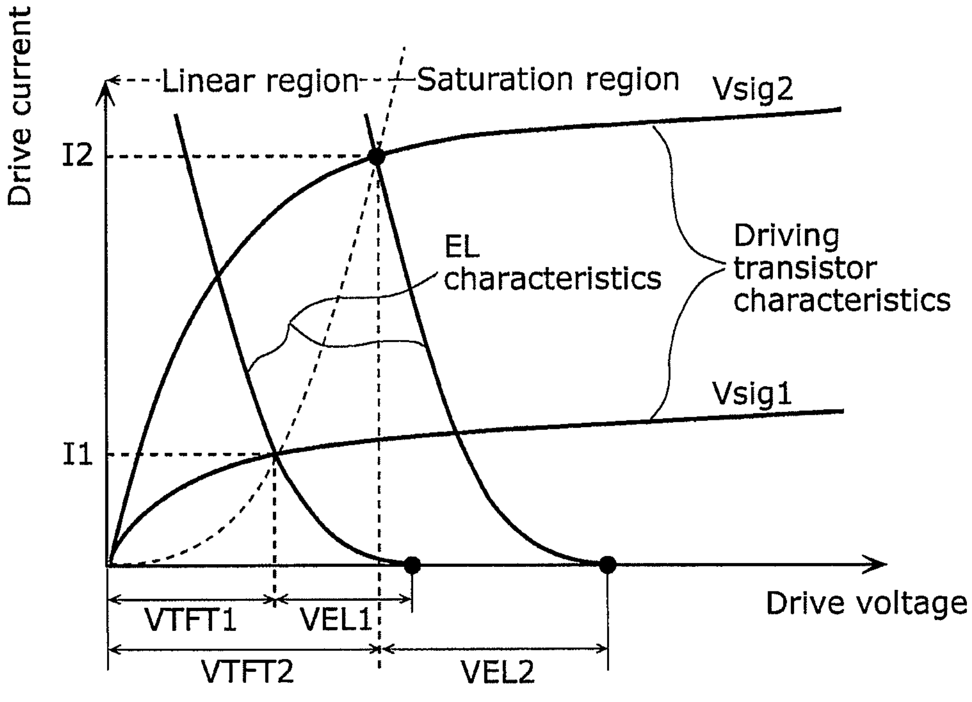
FIG. 20 is a graph showing together current-voltage characteristics of a driving transistor and current-voltage characteristics of an organic EL element.

FIG. 20 is a graph showing together the current-voltage characteristics of the driving transistor and the current-voltage characteristics of the organic EL element. In the horizontal axis, the direction of dropping with respect to the source potential of the drive transistor is the normal direction.

In the figure, current-voltage characteristics of the driving transistor and current-voltage characteristics of the organic EL element which correspond to two different gradations are shown, and the current-voltage characteristics of the driving transistor corresponding to a low gradation is indicated by Vsig1 and the current-voltage characteristics of the driving transistor corresponding to a high gradation is indicated by Vsig2.

In order to eliminate the impact of display defects due to changes in the source-to-drain voltage of the driving transistor, it is necessary to cause the driving transistor to operate in the saturation region. On the other hand, the pixel luminescence of the organic EL element is determined according to the drive current. Therefore, in order to cause the organic EL element to produce luminescence precisely in accordance with the gradation of video data, it is sufficient that the voltage remaining after the drive voltage (VEL) of the organic EL element corresponding to the drive current of the organic EL element is deducted from the voltage between the source of the driving transistor and the cathode of the organic EL element is a voltage that can cause the driving transistor to operate in the saturation region. Furthermore, in order to reduce power consumption, it is preferable that the drive voltage (VTFT) of the driving transistor be low.

Therefore, in FIG. 20, the organic EL element produces luminescence precisely in accordance with the gradation of the video data and power consumption is lowest with the VTFT+VEL that is obtained through the characteristics passing the point of intersection of the current-voltage characteristics of the driving transistor and the current-voltage characteristics of the organic EL element on the line indicating the boundary between the linear region and the saturation region of the driving transistor.

In this manner, the required voltage VTFT+VEL corresponding to the gradations for each color may be calculated using the graph shown in FIG. 20.

Furthermore, although the variable-voltage source supplies the high output voltage Vout to the first power source wire 112 and the second power source wire 113 is grounded in the periphery of the organic EL display unit in the respective embodiments, the variable-voltage source may supply low output voltage to the second power source wire 113.

Furthermore, the display device may include a low-potential monitor wire having one end connected to the monitor luminescent pixel 111M and the other end connected to the voltage measuring unit according to respective embodiments, for transmitting the low potential applied to the monitor luminescent pixel 111M.

Furthermore, in the respective embodiments, the voltage measuring unit may measure at least one of the high potential applied to the monitor luminescent pixel 111M and the low potential applied to the monitor luminescent pixel 111M, and the voltage regulating unit may regulate the power supplying unit in accordance with the measured potential so that the potential difference between the high potential of the monitor luminescent pixel 111M and the low potential of the monitor luminescent pixel is set to a predetermined potential difference.

With this, power consumption can be further reduced. This is because, since the cathode electrode of the organic EL element 121 which makes up part of the common electrode included in the second power source wire 113 uses a transparent electrode (for example, ITO) having high sheet resistance, the voltage drop amount for the second power source wire 113 is larger than the voltage drop amount for the first power source wire 112. Therefore, by regulating in accordance with the low potential applied to the monitor luminescent pixels 111M, the output potential of the power supplying unit can be regulated more appropriately.

Furthermore, in the second and fourth embodiments, the voltage measuring unit may measure the potential difference between the low potential of the monitor luminescent pixel 111M and the predetermined potential, and the power supplying unit may be regulated in accordance with the detected potential difference.

Furthermore, in the first and third embodiments, the signal processing circuit 160 may change the first reference voltage Vref1 on a plural frame (for example, a 3-frame) basis instead of changing the first reference voltage Vref1 on a per frame basis.

With this, the power consumption occurring in the variable-voltage source 180 can be reduced by the fluctuation of the potential of the first reference voltage Vref1.

Furthermore, the signal processing circuit 160 may measure the potential differences outputted from the potential difference detecting circuit 170 and the potential comparison circuit 370B over plural frames, average the measured potential differences, and regulate the variable-voltage source 180 in accordance with the average potential difference. Specifically, the process of detecting the potential at the detecting point (step S14) and the process of detecting the potential difference (step S15) in the flowchart shown in FIG. 5 may be executed over plural frames, and the potential differences for the plural frames detected in the process of detecting the potential difference (step S15) may be averaged in the process of determining the voltage margin (step S16), and the voltage margin may be determined in accordance with the average potential difference.

Furthermore, the signal processing circuits 160 and 260 may determine the first reference voltage Vref1 and the second reference voltage Vref2 with consideration being given to an aged deterioration margin for the organic EL element 121. For example, assuming that the aged deterioration margin for the organic EL element 121 is Vad, the signal processing circuit 160 may determine the voltage of the first reference voltage Vref1 to be VTFT+VEL+Vdrop+Vad, and the signal processing circuit 260 may determine the voltage of the second reference voltage Vref2 to be VTFT+VEL+Vad.

Furthermore, although the switch transistor 124 and the driving transistor 125 are described as being P-type transistors in the above-described embodiments, they may be configured of N-type transistors.

Furthermore, although the switch transistor 124 and the driving transistor 125 are TFTs, they may be other field-effect transistors.

Furthermore, the processing units included in the display devices 100, 200, 300A, 300B, and 400 according to the above-described embodiments are typically implemented as an LSI which is an integrated circuit. It is to be noted that part of the processing units included in the display devices 100, 200, 300A, 300B, and 400 can also be integrated in the same substrate as the organic EL display units 110 and 310. Furthermore, they may be implemented as a dedicated circuit or a general-purpose processor. Furthermore, a Field Programmable Gate Array (FPGA) which allows programming after LSI manufacturing or a reconfigurable processor which allows reconfiguration of the connections and settings of circuit cells inside the LSI may be used.

Furthermore, part of the functions of the data line driving circuit, the write scan driving circuit, the control circuit, the peak signal detecting circuit, the signal processing circuit, and the potential difference detecting circuit included in the display devices 100, 200, 300A, 300B, and 400 according to the embodiments of the present invention may be implemented by having a processor such as a CPU execute a program. Furthermore, the present invention may also be implemented as a display device driving method including the characteristic steps implemented through the respective processing units included in the display devices 100, 200, 300A, 300B, and 400.

Furthermore, although the foregoing descriptions exemplify the case where the display devices 100, 200, 300A, 300B, and 400 are active matrix-type organic EL display devices, the present invention may be applied to organic EL display devices other than the active matrix-type, and may be applied to a display device other than an organic EL display device using a current-driven luminescent element, such as a liquid crystal display device.

Figure 21:
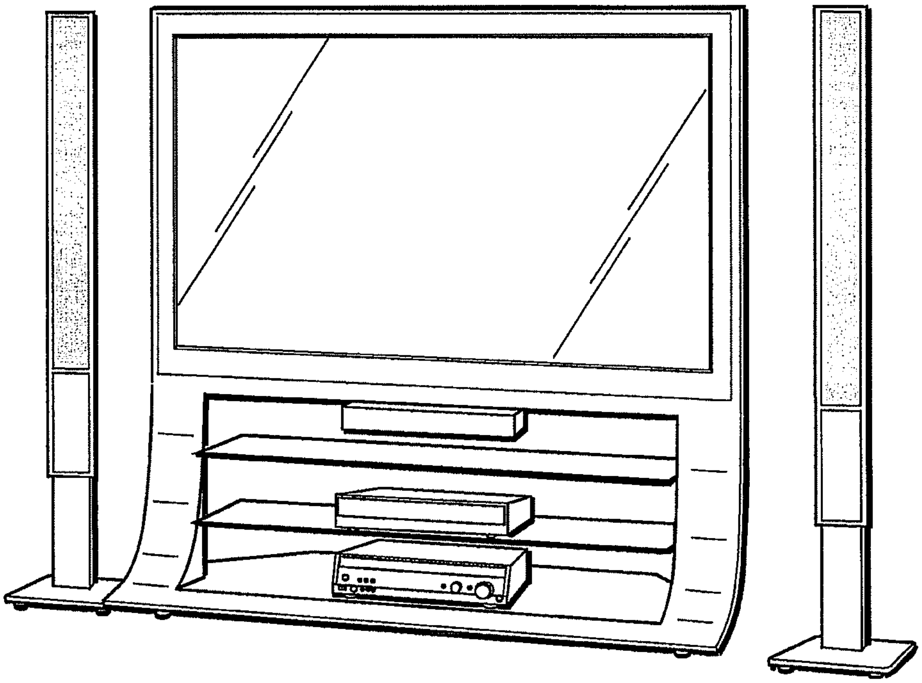
FIG. 21 is an outline view of a thin, flat TV in which the display device according to the present invention is built into.

Furthermore, for example, the display device according to the present invention is built into a thin, flat TV shown in FIG. 21. A thin, flat TV capable of high-accuracy image display reflecting a video signal is implemented by having the image display device according to the present invention built into the TV.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

The present invention is particularly useful as an active-type organic EL flat panel display.

What is claimed is:

1. An active matrix display device, comprising:
a plurality of luminescent pixels;
a power supply connected to said plurality of luminescent pixels and configured to apply a high potential and a low potential to said plurality of luminescent pixels;
a display in which said plurality of luminescent pixels are arranged;
a voltage measurer configured to measure, for at least one pixel from among said plurality of luminescent pixels arranged in said display, at least one potential of the high potential and the low potential of said at least one pixel, said at least one pixel being predetermined;
a voltage regulator configured to regulate said power supply in accordance with the at least one potential measured by the voltage measurer by setting a potential difference between the high potential and the low potential of said at least one pixel to a predetermined potential difference; and
at least one monitor wire having a first end connected to said at least one pixel and a second end connected to said voltage measurer for transmitting the at least one potential of the high potential and the low potential of said at least one pixel to said voltage measurer,
wherein each of said plurality of luminescent pixels includes a luminescent element, a capacitor, and a driver, said driver being configured to supply said luminescent element with current that is in accordance with a voltage held by said capacitor, and
the predetermined potential difference is a potential difference expressed as VTFT+VEL−ΔV+Vdrop, where VTFT is the voltage required by the driver, VEL is the voltage required by the luminescent element, ΔV is the potential difference between the potential outputted by the power supply and the potential of the luminescent pixel measured by the voltage measurer, and Vdrop is the voltage margin corresponding to ΔV.

2. The active matrix display device according to claim 1, wherein said voltage measurer is further configured to:
measure at least one of a high output potential and a low output potential of said power supply; and
detect at least one potential difference from among a first potential difference between the high output potential of said power supply and the high potential of said at least one pixel and a second potential difference between the low output potential of said power supply and the low potential of said at least one pixel, and
said voltage regulator is configured to regulate said power supply in accordance with the at least one potential difference detected by the voltage measurer.

3. The active matrix display device according to claim 2, wherein said voltage regulator is configured to measure the high output potential and the low output potential of said power supply, and
said voltage regulator is configured to regulate said power supply so that the at least one potential difference detected by said voltage measurer and a potential difference between the high output potential and the low output potential of said power supply are in an increasing function relationship.

4. The active matrix display device according to claim 1, wherein said voltage regulator is configured to:
detect a potential difference between the at least one potential of said at least one pixel measured by said voltage measurer and a predetermined potential; and
regulate said power supply in accordance with the detected potential difference.

5. The active matrix display device according to claim 4, wherein said voltage regulator is configured to regulate said power supply so that the detected potential difference and a potential difference between a high output potential of said power supply and a low output potential of said power supply are in an increasing function relationship.

6. The active matrix display device according to claim 1, wherein said voltage measurer is configured to measure, for each of at least two pixels from among said plurality of luminescent pixels, at least one potential of the high potential and the low potential of each of said at least two pixels.

7. The active matrix display device according to claim 6, wherein said voltage regulator is configured to:
select at least one potential from among:
a lowest potential of the high potential of each of said at least two pixels and measured by the voltage measurer; and
a highest potential of the low potential of each of said at least two pixels and measured by the voltage measurer; and
regulate said power supply based on the at least one potential selected by said voltage regulator.

8. The active matrix display device according to claim 1, wherein
said driver includes a source electrode and a drain electrode,
said luminescent element includes a first electrode and a second electrode, said first electrode being connected to one of said source electrode and said drain electrode of said driver, and
the high potential is applied to one of an other of said source electrode and said drain electrode and said second electrode, and
the low potential is applied to an other of the other of said source electrode and said drain electrode and said second electrode.

9. The active matrix display device according to claim 8, wherein said second electrode is part of a common electrode that is common to said plurality of luminescent pixels,
said common electrode is electrically connected to said power supply so that a potential is applied to said common electrode from a periphery of said common electrode, and
said at least one pixel that is predetermined is located near a center of said display.

10. The active matrix display device according to claim 9, wherein said second electrode comprises a transparent conductive material including a metal oxide.

11. The active matrix display device according to claim 8, wherein said luminescent element is an organic electroluminescence element.

12. A driving method of an active matrix display device including a power supply and a display panel, the display panel including a plurality of luminescent pixels connected to the power supply, the power supply applying a high potential and a low potential to the plurality of luminescent pixels, said method comprising:

measuring, for at least one pixel from among the plurality of luminescent pixels included in the display, at least one potential of the high potential and the low potential of the at least one pixel, the at least one potential being measured via at least one monitor wire having a first end connected to the at least one pixel and a second end connected to a voltage measurer for transmitting the at least one potential of the high potential and the low potential of the at least one pixel to the voltage measurer; and regulating the power supply in accordance with the at least one potential by setting a potential difference between the high potential and the low potential of the at least one pixel to a predetermined potential difference, wherein each of the plurality of luminescent pixels includes a luminescent element, a capacitor, and a driver, the driver being configured to supply the luminescent element with current that is in accordance with a voltage held by the capacitor, and the predetermined potential difference is a potential difference expressed as VTFT+VEL−ΔV+Vdrop, where VTFT is the voltage required by the driver, VEL is the voltage required by the luminescent element, ΔV is the potential difference between the potential outputted by the power supply and the potential of the luminescent pixel measured by the voltage measurer, and Vdrop is the voltage margin corresponding to ΔV.

13. The driving method of the active matrix display device according to claim 12, wherein the at least one potential is measured for a plurality of display frames, and an average of the at least one potential is determined for the plurality of display frames, and the power supply is regulated in accordance with the average of the at least one potential.

14. An active matrix display device, comprising:

a plurality of luminescent pixels;

a power supply connected to said plurality of luminescent pixels and configured to apply a high potential and a low potential to said plurality of luminescent pixels;

a display in which said plurality of luminescent pixels are arranged;

a voltage measurer configured to measure, for at least one pixel from among said plurality of luminescent pixels arranged in said display, at least one potential of the high potential and the low potential of said at least one pixel, said at least one pixel being predetermined;

a voltage regulator configured to regulate said power supply in accordance with the at least one potential measured by the voltage measurer by setting a potential difference between the high potential and the low potential of said at least one pixel to a predetermined potential difference; and at least one monitor wire having a first end connected to said at least one pixel and a second end connected to said voltage measurer for transmitting the at least one potential of the high potential and the low potential of said at least one pixel to said voltage measurer, wherein each of said plurality of luminescent pixels includes a luminescent element, a capacitor, and a driver, said driver being configured to supply said luminescent element with current that is in accordance with a voltage held by said capacitor, and one of a first electrode and a second electrode of said luminescent element is part of a common electrode that is common to said plurality of luminescent pixels in both a row direction and a column direction, and the predetermined potential difference is a potential difference expressed as VTFT+VEL−ΔV+Vdrop, where VTFT is the voltage required by the driver, VEL is the voltage required by the luminescent element, ΔV is the potential difference between the potential outputted by the power supply and the potential of the luminescent pixel measured by the voltage measurer, and Vdrop is the voltage margin corresponding to ΔV.

15. The active matrix display device according to claim 14, wherein said voltage measurer is further configured to:

measure at least one of a high output potential and a low output potential of said power supply; and detect at least one potential difference from among a first potential difference between the high output potential of said power supply and the high potential of said at least one pixel and a second potential difference between the low output potential of said power supply and the low potential of said at least one pixel, and said voltage regulator is configured to regulate said power supply in accordance with the at least one potential difference detected by the voltage measurer.

16. The active matrix display device according to claim 15, wherein said voltage regulator is configured to measure the high output potential and the low output potential of said power supply, and said voltage regulator is configured to regulate said power supply so that the at least one potential difference detected by said voltage measurer and a potential difference between the high output potential and the low output potential of said power supply are in an increasing function relationship.

17. The active matrix display device according to claim 14, wherein said voltage regulator is configured to:

detect a potential difference between the at least one potential of said at least one pixel measured by said voltage measurer and a predetermined potential; and regulate said power supply in accordance with the detected potential difference.

18. A display device, comprising:

a plurality of luminescent pixels;

a power supply connected to said plurality of luminescent pixels and configured to apply a high potential and a low potential to said plurality of luminescent pixels;

a display in which said plurality of luminescent pixels are arranged;

a voltage measurer configured to measure, for at least one pixel from among said plurality of luminescent pixels arranged in said display, at least one potential of the high potential and the low potential applied to said at least one pixel, said at least one pixel being predetermined; and a voltage regulator configured to regulate said power supply in accordance with the at least one potential measured by the voltage measurer by setting a potential difference between the high potential and the low potential applied to said at least one pixel to a predetermined potential difference, wherein each of said plurality of luminescent pixels includes a luminescent element, and a driver, and the predetermined potential difference is a potential difference expressed as VTFT+VEL−ΔV+Vdrop, where VTFT is the voltage required by the driver, VEL is the voltage required by the luminescent element, ΔV is the potential difference between the potential outputted by the power supply and the potential of the luminescent pixel measured by the voltage measurer, and Vdrop is the voltage margin corresponding to ΔV.

* * * * *